(12) United States Patent
Okada et al.

(10) Patent No.: US 7,864,425 B2
(45) Date of Patent: Jan. 4, 2011

(54) COMPOSITE MATERIAL AND OPTICAL COMPONENT USING THE SAME

(75) Inventors: Yuka Okada, Hyogo (JP); Tsuguhiro Korenaga, Osaka (JP); Masa-aki Suzuki, Osaka (JP); Norihisa Takahara, Osaka (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 12/064,411

(22) PCT Filed: Sep. 4, 2006

(86) PCT No.: PCT/JP2006/317425

§ 371 (c)(1),
(2), (4) Date: Feb. 21, 2008

(87) PCT Pub. No.: WO2007/032217

PCT Pub. Date: Mar. 22, 2007

(65) Prior Publication Data

US 2009/0128912 A1 May 21, 2009

(30) Foreign Application Priority Data

Sep. 16, 2005 (JP) ............................. 2005-269610

(51) Int. Cl.
*G02B 5/18* (2006.01)
(52) U.S. Cl. ..................................... 359/569
(58) Field of Classification Search ................. 359/566, 359/569, 576
See application file for complete search history.

(56) References Cited

U.S. PATENT DOCUMENTS

| 5,618,872 A | 4/1997 | Pohl et al. |
| 5,734,502 A | 3/1998 | Ebstein |
| 5,847,877 A | 12/1998 | Imamura et al. |
| 6,291,070 B1 | 9/2001 | Arpac et al. |
| 6,480,332 B1 | 11/2002 | Nakai |
| 2004/0254282 A1 | 12/2004 | Suzuki et al. |
| 2005/0243423 A1 | 11/2005 | Nakai et al. |
| 2005/0261406 A1* | 11/2005 | Nakayama et al. .......... 524/284 |
| 2009/0140284 A1 | 6/2009 | Kurino et al. |
| 2010/0134888 A1 | 6/2010 | Korenaga et al. |

FOREIGN PATENT DOCUMENTS

| JP | 63-308069 | 12/1988 |
| JP | 3-191319 | 8/1991 |
| JP | 9-127321 | 5/1997 |
| JP | 11-43556 | 2/1999 |
| JP | 11-44810 | 2/1999 |

(Continued)

OTHER PUBLICATIONS

"Kikan Kagaku Sosetsu (Quarterly Chemical Review) No. 39 Control of refractive index of transparent polymer", Fumio Ide, edited by the Chemical Socitey of Japan, issued on Nov. 10, 1998, p. 9, FIG.2.

*Primary Examiner*—Alessandro Amari
(74) *Attorney, Agent, or Firm*—Hamre, Schumann, Mueller & Larson, P.C.

(57) ABSTRACT

A composite material (10) includes a resin (12), and first inorganic particles (11) dispersed in the resin and containing at least zirconium oxide. The composite material has a refractive index at the d line $n_{COMd}$ of not less than 1.60 and an Abbe's number $v_{COM}$ of not less than 20, and satisfies a relationship $n_{COMd} \geq 1.8 - 0.005\, v_{COM}$. This composite material exhibits both a high refractive index and low dispersion in good balance, and has excellent workability. Accordingly, using this composite material makes it possible to realize a small optical component having favorable wavelength characteristics.

20 Claims, 15 Drawing Sheets

FOREIGN PATENT DOCUMENTS

| | | |
|---|---|---|
| JP | 11-287904 | 10/1999 |
| JP | 2001-183501 | 7/2001 |
| JP | 2001-249208 | 9/2001 |
| JP | 2001-526719 | 12/2001 |
| JP | 2002-241509 | 8/2002 |
| JP | 2003-073559 | 3/2003 |
| JP | 2003-073563 | 3/2003 |
| JP | 2003-073564 | 3/2003 |
| JP | 2003-137912 | 5/2003 |
| JP | 2004-126511 | 4/2004 |
| JP | 2005-036184 | 2/2005 |
| JP | 2005-146042 | 6/2005 |
| JP | 2005-148615 | 6/2005 |
| JP | 2005-264038 | 9/2005 |
| JP | 2005-316178 | 11/2005 |
| JP | 2005-316219 | 11/2005 |
| JP | 2005-338798 | 12/2005 |
| WO | 00/06622 | 2/2000 |
| WO | 2007/026597 | 3/2007 |
| WO | 2007/049573 | 5/2007 |

* cited by examiner

COMPOSITE MATERIAL AND OPTICAL COMPONENT USING THE SAME

TECHNICAL FIELD

The present invention relates to a composite material and an optical component using the same. More particularly, the invention relates to a composite material exhibiting a high refractive index and low dispersion and an optical component using the composite material, such as a lens, a diffractive optical element or a solid-state image sensor.

BACKGROUND ART

In recent years, optoelectronics have garnered attention as a key technology for realizing, for example, higher-speed information communications or various smaller and lighter electronic devices, and the development of optical materials for achieving these has become imperative.

Conventionally, inorganic materials such as optical glass commonly have been used as optical materials. However, inorganic optical materials are difficult to process, and they have the inherent problem of difficulty to produce optical components, which increasingly have become finer and more complex, in a large quantity and at low cost, by using inorganic optical materials.

On the other hand, organic optical materials typified by resins have excellent workability, can be produced at a reduced cost, and moreover, they are lightweight. Therefore, organic optical materials are expected to serve as the materials for supporting future optoelectronics technology, and their development tends to accelerate in recent years.

The problems of organic optical materials include that an optical component formed of an organic optical material alone does not provide a sufficiently high refractive index, and that there are few organic optical materials that are well-balanced in terms of the refractive index and the dispersion. It is known that the refractive index $n_{mD}$ at the D-line (wavelength: 589 nm) of resin materials, which are most commonly used as the organic optical material, and their Abbe's number $v_m$, which indicates the dispersion, largely satisfy Formula (1) below (see Non-patent Document 1). It should be noted that since the wavelength of the D-line and that of the d-line (wavelength 587: nm) are very near, the refractive index at the D-line and that at the d-line of each of the materials can be considered to show substantially the same tendency.

$$1.66-0.004 v_m \leq n_{mD} \leq 1.8-0.005 v_m \qquad (1)$$

For example, in the case where a lens serves as the optical component, the fact that the refractive index of the resin is not sufficiently high and the fact that there are few materials that are well-balanced in terms of the refractive index and the dispersion lead to the problem that sufficient characteristics cannot be achieved owing to chromatic aberration or field curvature. Furthermore, in the case where a solid-state image sensor including an optical waveguide serves as the optical component, a sufficient refractive index difference between the optical waveguide and the surrounding materials cannot be achieved, which results in the problem of a reduced light collection efficiency.

In order to solve these problems, studies have been made to disperse inorganic fine particles in a resin serving as the substrate to prepare an organic optical material with a high refractive index, and to use this material to form an optical component. Patent Document 1 discloses a method for forming an optical component from a resin composition in which fine particles of alumina, yttrium oxide or the like are dispersed in a transparent substrate resin such as a methacrylic resin as a method for obtaining an optical component made of an organic optical material exhibiting a high refractive index and low dispersion. Patent Documents 2 to 4 disclose methods for forming an optical component from a thermoplastic resin composition in which fine particles of titanium oxide or zinc oxide are dispersed in a thermoplastic resin having a certain level of optical characteristics.

Patent document 1: JP2001-183501 A
Patent document 2: JP2003-073559 A
Patent document 3: JP2003-073563 A
Patent document 4: JP2003-073564 A Non-patent document 1: "Kikan Kagaku Sosetsu (Quarterly Chemical Review) No. 39 Control of refractive index of transparent polymer", Fumio Ide, edited by The Chemical Society of Japan, issued on Nov. 10, 1998, page 9, FIG. 2)

DISCLOSURE OF INVENTION

Problem to be Solved by the Invention

However, since alumina, whose refractive index at the d-line (wavelength: 587 nm) (hereinafter, referred to as "d-line refractive index") is 1.76, is dispersed in a substrate resin in the method disclosed in Patent Document 1, it is fundamentally difficult to obtain a resin composition having a high refractive index. Although Patent Document 1 also discloses a method of dispersing inorganic fine particles other than alumina in a substrate resin, it describes, in this case, that an anomalous dispersion substance such as an infrared-absorbing dye is dispersed additionally in order to achieve a sufficiently high Abbe's number, or in other words, low dispersion. Further, titanium oxide (Abbe's number: 12) or zinc oxide (Abbe's number: 12), each of which exhibits high dispersion, is used as inorganic fine particles dispersed in the substrate resin in the methods disclosed in Patent Documents 2 to 4. Accordingly, increasing the dispersion ratio of the inorganic fine particles to obtain a resin composition having a high refractive index significantly increases the dispersion, so that it is difficult to obtain a resin composition exhibiting both a high refractive index and low dispersion.

In such circumstances, it is an object of the present invention to provide a composite material exhibiting both a high refractive index and low dispersion in good balance and having excellent workability, and an optical component using this composite material.

Means for Solving Problem

In order to achieve the above-described object, a composite material according to the present invention includes: a resin; and first inorganic particles dispersed in the resin and containing at least zirconium oxide, wherein the composite material has a refractive index at the d line $n_{COMd}$ of not less than 1.60 and an Abbe's number $v_{COM}$ of not less than 20, and satisfies $$\text{a relationship } n_{COMd} \geq 1.8-0.005 v_{COM} \qquad (2).$$

Furthermore, an optical component according to the present invention includes the above-described composite material of the present invention.

EFFECTS OF THE INVENTION

The composite material according to the present invention is a composition exhibiting both a high refractive index and low dispersion in good balance and having excellent workability.

The optical component according to the present invention is formed using the composite material exhibiting both a high refractive index and low dispersion, and therefore, it exhibits favorable wavelength characteristics and can be reduced in size.

BEST MODE FOR CARRYING OUT THE INVENTION

Figure 1:
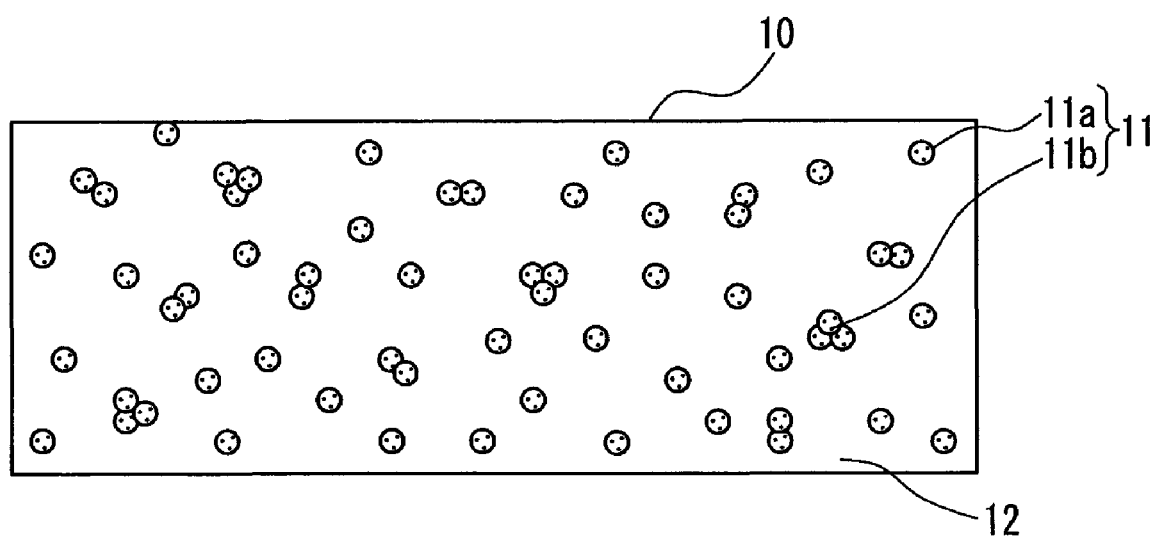
FIG. 1 is a cross-sectional view schematically showing a composite material according to a first embodiment of the present invention.

In the present invention, "composite material" means a material composed of at least a resin and inorganic particles dispersed in the resin. Other than the resin and the inorganic particles, the composite material of the present invention may include a component that is added to improve various physical properties, such as dispersibility of the inorganic particles, film leveling properties, flame resistance and antistatic properties, and that remains in the cured composite material. Further, the "composite material" of the present invention also may include a composition containing a component such as a solvent that is added to improve, for example, the handleability of the uncured composite material and that essentially does not remain in the cured composite material.

In the present invention, "refractive index of composite material" means an effective refractive index of the cured composite material when the cured composite material is regarded as a medium having a single refractive index.

It is preferable that, in a two-dimensional coordinate system in which the vertical axis represents the refractive index at the d-line and the horizontal axis represents the Abbe's number, when nm represents the refractive index at the d-line of the resin constituting the composite material of the present invention, and $\nu_m$ represents the Abbe's number of the resin, the point $(n_m, \nu_m)$ is located in a region enclosed by (1.4, 75), (1.55, 60), (1.6, 35) and (1.45, 35), and the point $(n_{COMd}, \nu_{COM})$ is located in a region enclosed by (1.6, 40), (1.6, 53), (1.81, 43), (1.84, 35) and (1.625, 35).

The composite material according to the present invention further may include second inorganic particles dispersed in the resin and having an Abbe's number $\nu_p$ of not less than 50.

It is preferable that the second inorganic particles are silica or alumina.

In the case where the composite material includes the second inorganic particles, it is preferable that, in a two-dimensional coordinate system in which the vertical axis represents the refractive index at the d-line and the horizontal axis represents the Abbe's number, when $n_m$ represents the refractive index at the d-line of the resin constituting the composite material of the present invention and $\nu_m$ represents the Abbe's number of the resin, the point $(n_m, \nu_m)$ is located in a region enclosed by (1.4, 75), (1.55, 60), (1.6, 35) and (1.45, 35) and the point $(n_{COMd}, V_{COM})$ is located in a region enclosed by (1.6, 40), (1.6, 53), (1.73, 52), (1.81, 43), (1.84, 35) and (1.625, 35).

It is preferable that the resin is an energy ray-curable resin including at least one selected from the group consisting of a methacrylic group, an acrylic group and an epoxy group.

It is preferable that the resin includes at least one selected from the group consisting of an alicyclic hydrocarbon group, a siloxane structure and a fluorine atom.

The weight ratio of the first inorganic particles to the composite material as a whole preferably is not less than 5 wt % and not more than 85 wt %, and more preferably is not less than 50 wt % and not more than 85 wt %.

The total weight ratio of the first inorganic particles and the second inorganic particles to the composite material as a whole preferably is not less than 5 wt % and not more than 85 wt %, and more preferably is not less than 50 wt % and not more than 85 wt %.

In the present invention, "weight ratio" or "volume ratio" of the inorganic particles to the composite material as a whole refers to the weight ratio or volume ratio of the inorganic particles to the cured composite material, that is, the total of the resin and the inorganic particles (and other residual components after curing, if any). Therefore, a component, such as a solvent, that is added to improve, for example, the handleability of the uncured composite material and will not essentially remain in the cured composite material is not included in the calculation of the weight ratio and the volume ratio.

It is preferable that the first inorganic particles have an effective particle diameter in the range of not less than 1 nm and not more than 100 nm. Further, it is preferable that the first inorganic particles and the second inorganic particles have an effective particle diameter in the range of not less than 1 nm and not more than 100 nm.

An optical component according to the present invention includes the above-described composite material of the present invention.

A lens according to the present invention includes the above-described composite material of the present invention.

A diffractive optical element according to the present invention includes: a substrate made of a first material and having a diffraction grating pattern formed on its surface; and a protective film made of a second material and covering the diffraction grating pattern. The first material and the second material each include a resin, and at least one of the first material and the second material is the above-described composite material of the present invention. Preferably, the second material is the above-described composite material of the present invention.

A solid-state image sensor according to the present invention includes: a photoelectric conversion portion; and an optical waveguide disposed above the photoelectric conversion portion. The optical waveguide is made of the above-described composite material of the present invention.

Hereinafter, embodiments of the present invention will be described. It should be noted that the present invention is not limited to the examples shown below.

First Embodiment

A composite material 10 according to the first embodiment of the present invention will be described with reference to FIG. 1.

The composite material 10 according to the first embodiment of the present invention is formed by uniformly dispersing inorganic particles (first inorganic particles) 11 containing at least zirconium oxide in a resin 12 serving as a substrate. Generally, the inorganic particles 11 include primary particles 11a, and secondary particles 11b, which are formed by a plurality of aggregated primary particles 11a. Accordingly, the inorganic particles 11 being uniformly dispersed in the resin 12 means that the primary particles 11a and the secondary particles 11b of the inorganic particles 11 are substantially uniformly dispersed in the composite material 10, without being unevenly distributed in any particular position in the composite material 10. In order for the composite material 10 to have favorable particle dispersibility, it is preferable that the inorganic particles 11 are composed only of the primary particles 11a.

The particle diameter of the inorganic particles 11 is an important factor for ensuring the light transmission of the composite material 10 in which the inorganic particles 11 containing zirconium oxide are dispersed. When the particle diameter of the inorganic particles 11 is sufficiently smaller than the wavelength of light, the composite material in which the inorganic particles 11 are dispersed can be considered as a homogeneous medium without variations of the refractive index. When the particle diameter of the inorganic particles 11 is equal to or less than one-fourth of the wavelength of light, only Rayleigh scattering occurs in the composite material, resulting in higher light transmission. Therefore, in order to realize high light transmission, the particle diameter of the inorganic particles 11 preferably is not more than 100 nm. However, when the particle diameter of the inorganic particles 11 is less than 1 nm, fluorescent light may occur if the inorganic particles 11 are made of a material that exhibits a quantum effect. This may affect the characteristics of an optical component formed using the composite material. From the above-described viewpoints, the effective particle diameter of the inorganic particles 11 preferably is in the range of not less than 1 nm and not more than 100 nm, and more preferably is in the range of not less than 1 nm and not more than 50 nm. It is more preferable that the effective particle diameter of the inorganic particles 11 is in the range of not less than 1 nm and not more than 20 nm, in particular, since the influence of Rayleigh scattering is very small and the light transmission of the composite material 10 is particularly high.

Figure 2:
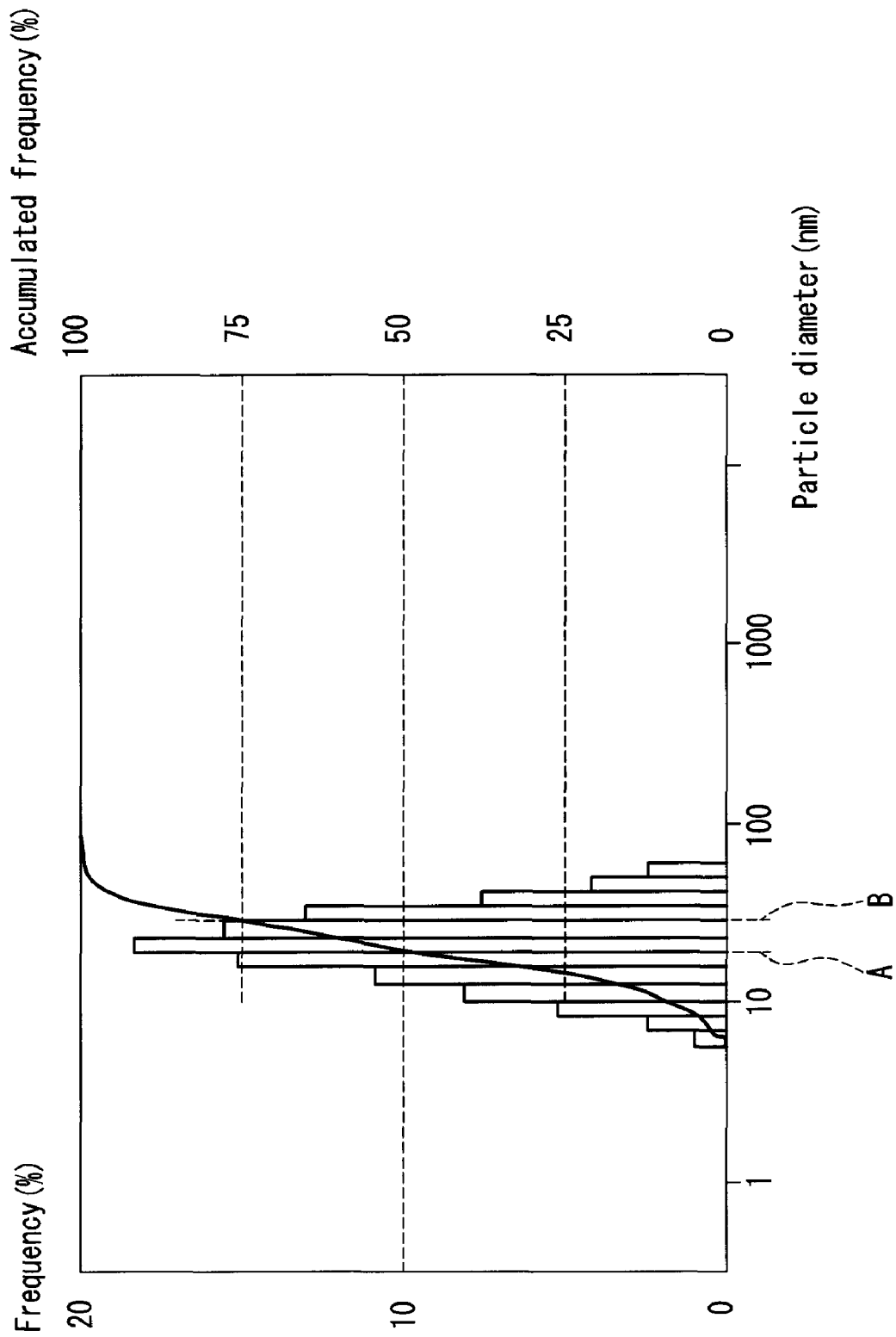
FIG. 2 is a graph illustrating the effective particle diameter of inorganic particles according to the present invention.

Here, the effective particle diameter will be described with reference to FIG. 2. In FIG. 2, the horizontal axis denotes the particle diameter of the inorganic particles, the left vertical axis denotes the frequency of the inorganic particles with respect to the particle diameters denoted on the horizontal axis, and the right vertical axis denotes the accumulated frequency of the particle diameter. Here, in the case where the inorganic particles are aggregated, the particle diameter on the horizontal axis represents the secondary particle diameter in an aggregated state. The effective particle diameter as used in the present invention means the center particle diameter (median diameter: d50) A where the accumulated frequency is 50% in a particle diameter frequency distribution graph of the inorganic particles as shown in FIG. 2. It is preferable that the particle diameter B where the accumulated frequency of the particle diameter of the inorganic particles 11 is 75% is within the above-described range, since the number of the inorganic particles that induce the light loss due to Rayleigh scattering increases, which improves the refractive index of the composite material. In order to determine the value of the effective particle diameter with accuracy, it is preferable to measure the particle diameter of, for example, not less than 200 inorganic particles.

The particle diameter and effective particle diameter of the inorganic particles 11 in the cured composite material 10 can be measured using an electron microscope, a small angle X-ray scattering technique or the like. The particle diameter of the primary particles 11a or the particle diameter and effective particle diameter of the inorganic particles 11 can be measured by gas adsorption when they are in a powdery state before being dispersed in the resin, or can be measured using a particle size distribution meter by the light scattering method, the ultrasonic method or the like when the particles are dispersed in a solvent and/or uncured resin. The correlation between the particle diameter and the effective particle diameter measured before curing the composite material and the particle diameter and effective particle diameter measured after the curing may be determined during the manufacturing process of the composite material 10 or in the manufacturing process of an optical component using the composite material 10, and the determined correlation may be used for quality control of the composite material 10.

As described above, the composite material 10 according to the present invention is formed by dispersing the inorganic particles 11 containing at least zirconium oxide in the resin 12. Based on the following investigation, the present inventors found that it is effective to use zirconium oxide as the inorganic particles 11 in the composite material 10 in which the inorganic particles 11 are dispersed in the resin 12 in order to suppress a decrease of the Abbe's number of the optical material, while improving the refractive index.

Figure 3:
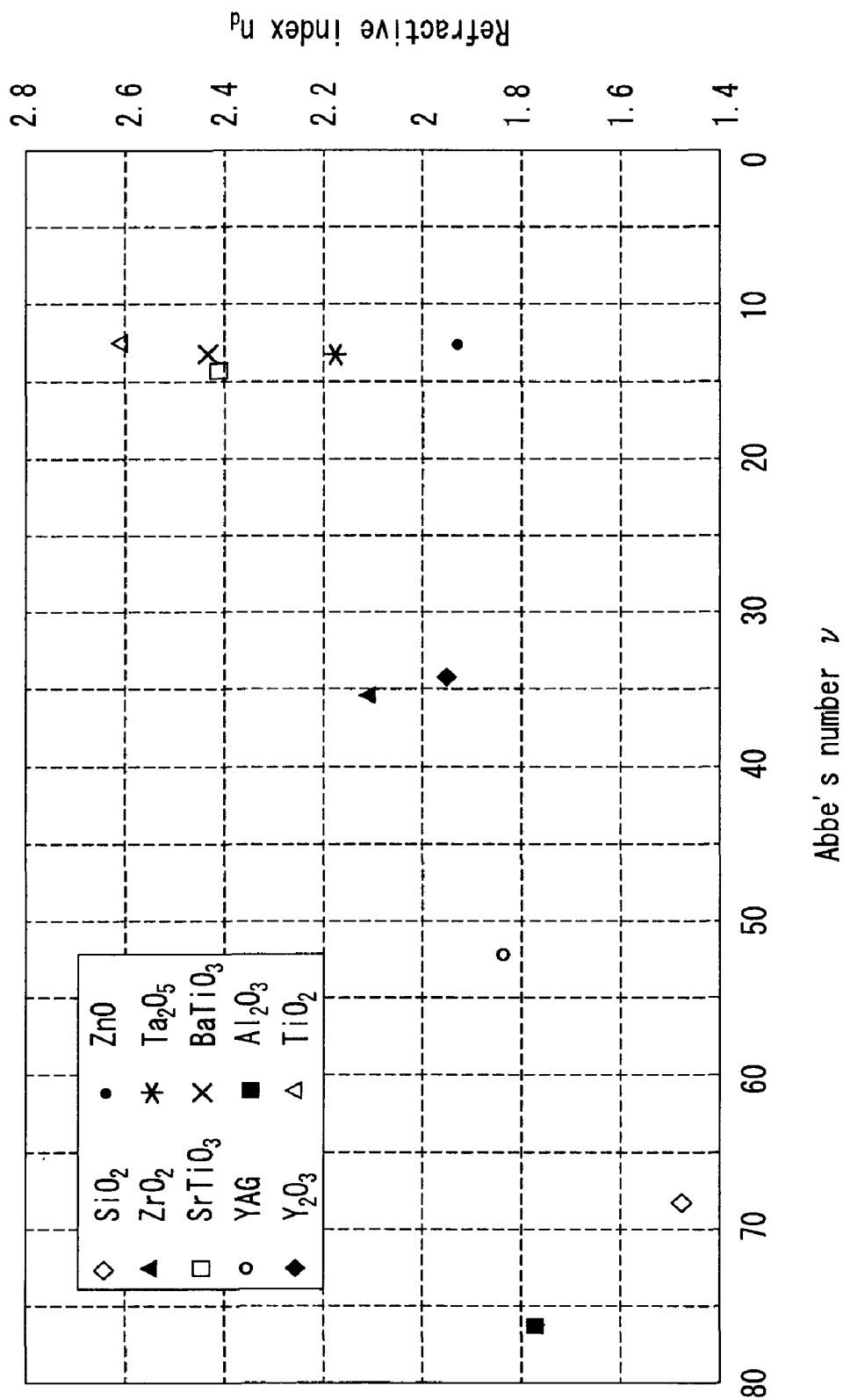
FIG. 3 is a graph illustrating the relationship between the refractive index at the d-line $n_d$ and Abbe's number $\nu$ of the inorganic substances contained in the composite material of the present invention and other inorganic substances.

FIG. 3 is a graph showing the relationship between the refractive index at the d-line (wavelength: 587 nm) (d-line refractive index) $n_d$ and the Abbe's number ν representing the dispersion for various inorganic materials. It should be noted that Abbe's number ν is a numerical value defined by Formula (3) below. In Formula (3), $n_F$, and $n_C$ represent refractive indices at the F line (wavelength: 486 nm) and the C line (wavelength: 656 nm), respectively.

$$\nu = (n_d - 1)/(n_F - n_C) \quad (3)$$

The numerical values of the Abbe's number of inorganic substances have not been fully known. Therefore, FIG. 3 shows Abbe's numbers obtained by forming thin films of inorganic substances on a silicon substrate by sputtering or CVD, and measuring the wavelength dependence of the refractive indices by spectroscopic ellipsometry. As shown in FIG. 3, zirconium oxide had a high d-line refractive index $n_d$ of 2.1, and a relatively high Abbe's number ν of 35. The d-line refractive index $n_d$ of zirconium oxide was more than 2.0. This is close to the d-line refractive index $n_d$ of titanium oxide, which is known as a high refractive index material. Further, the Abbe's number ν of zirconium oxide was higher than that of titanium oxide and the like. Accordingly, it was found that the zirconium oxide is a material having the characteristic of low dispersion, and exhibiting both a high refractive index and low dispersion.

Figure 4:
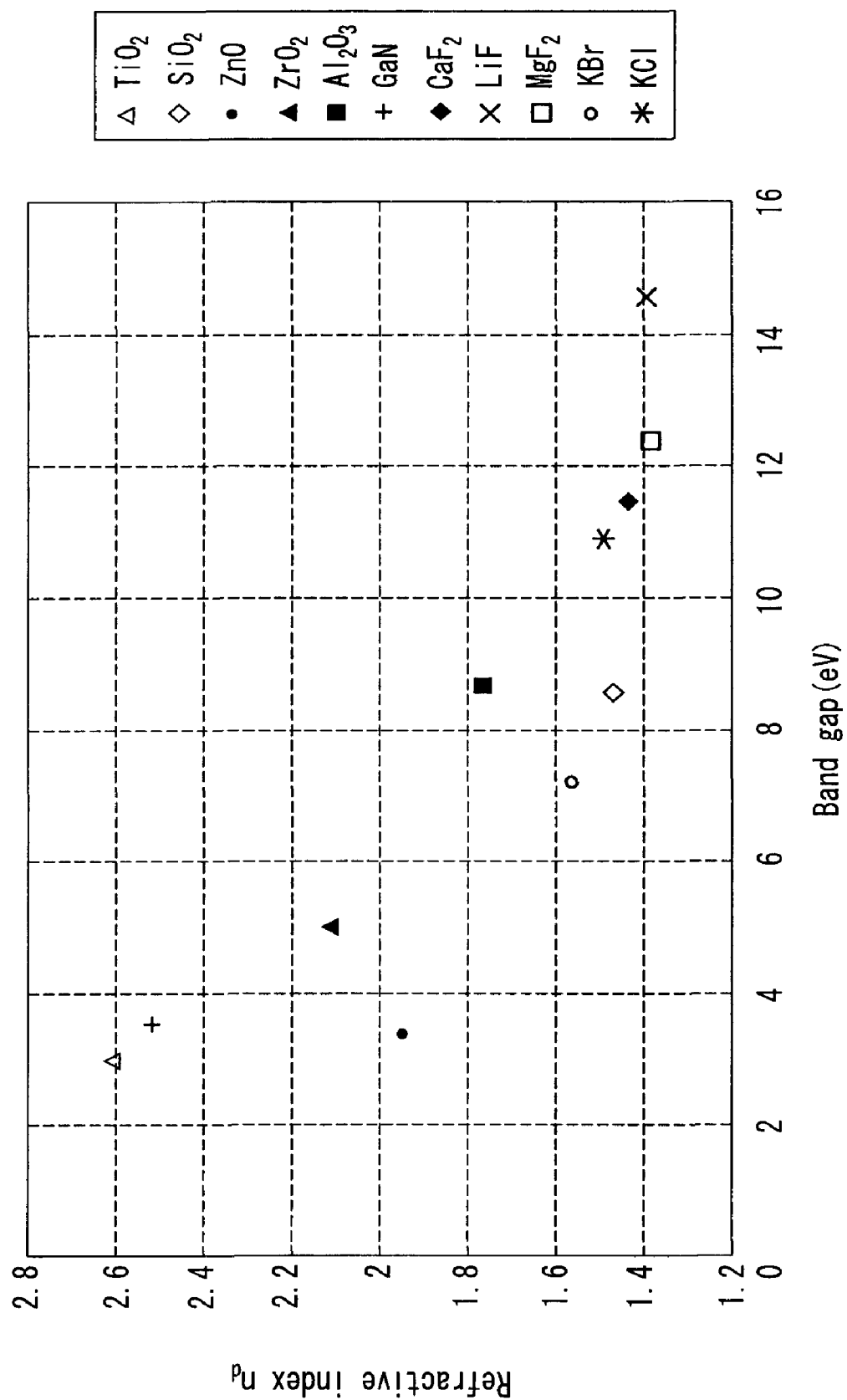
FIG. 4 is a graph illustrating the relationship between the band gap and the refractive index at the d-line $n_d$ of the inorganic substances contained in the composite material of the present invention and other inorganic substances.
Figure 5:
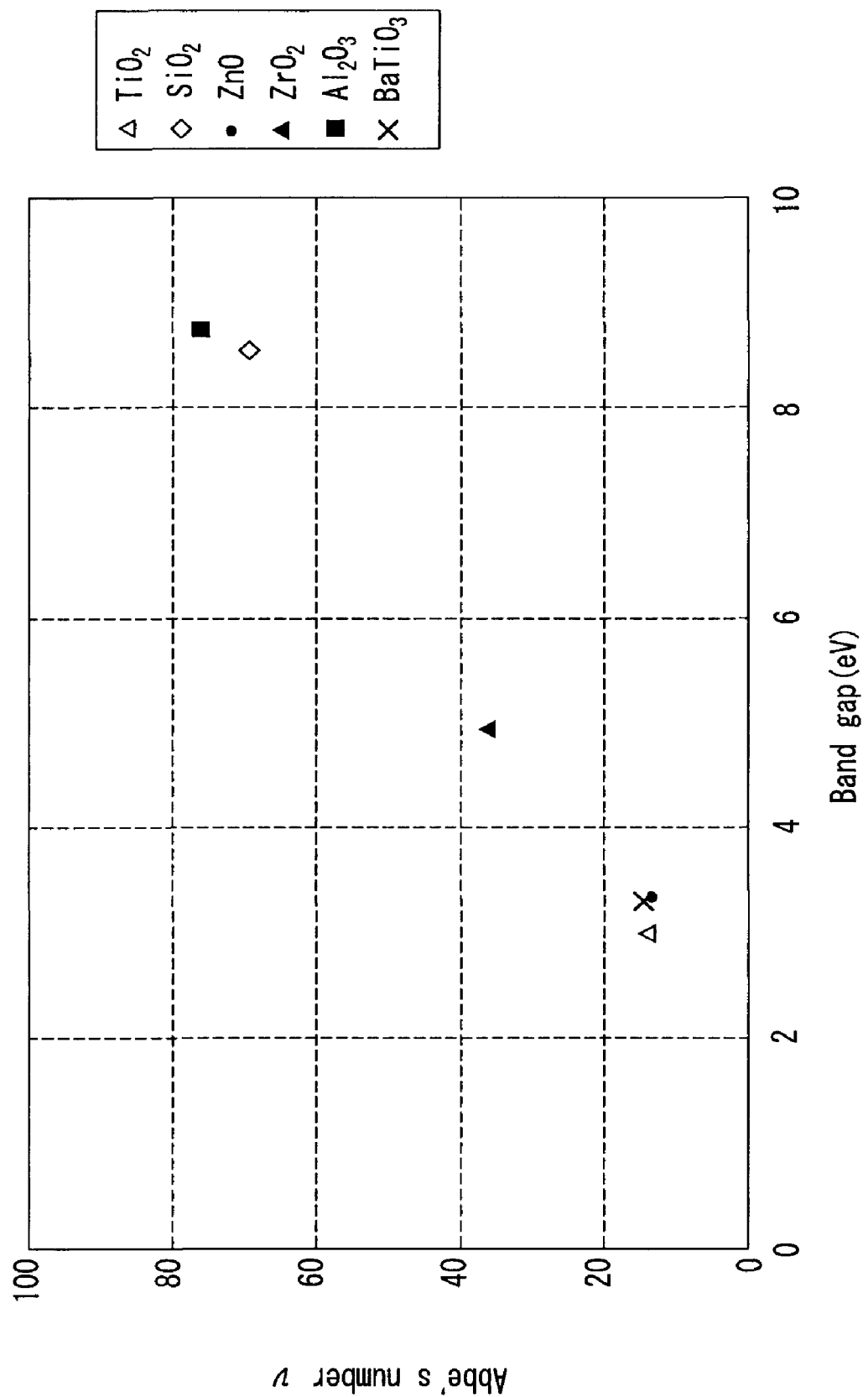
FIG. 5 is a graph illustrating the relationship between the band gap and the Abbe's number $\nu$ of the inorganic substances contained in the composite material of the present invention and other inorganic substances.

FIG. 4 shows the relationship between the band gap and the d-line refractive index $n_d$ of various inorganic materials, and FIG. 5 shows the relationship between the band gap and the Abbe's number ν of the various inorganic oxides. From these graphs, it seems that there is a relation between the d-line refractive index of semiconductors such as a metal oxide and the band gap, which is an energy difference between the valence band and the conduction band.

Since a semiconductor absorbs the electromagnetic waves of wavelengths corresponding to its band gap energy, it has an absorption edge ranging from the visible light region to the ultraviolet region. In order to secure the light transmission of the composite material in the visible light region (wavelength: 400 to 800 nm), it is required that the inorganic particles to be dispersed have an absorption edge in a wavelength region shorter than 400 nm, or in other word, the band gap of the inorganic particles is not less than about 3 eV. On the other hand, since the dispersion of the refractive index is a change of the refractive index in the neighboring wavelengths under the presence of the absorption edge, as the absorption edge moves away from the visible light region toward the ultraviolet region, that is, as the band gap increases, the refractive index change due to the wavelength change decreases in the visible light region is reduced and, therefore, the dispersion is reduced. However, if the band gap of the inorganic particles increases further, then the inorganic particles come to be electrically insulating, reducing the dielectric constant and the refractive index, which is the square root of the dielectric constant.

As shown in FIGS. 4 and 5, the band gap of zirconium oxide is 5.0 eV. In terms of the band gap, zirconium oxide is placed in a middle position between titanium oxide, zinc oxide or the like, which have a high refractive index and low dispersion, and silica, alumina or the like, which are insulators having a relatively low refractive index. That is, it can be seen that, also in view of the band gap, zirconium oxide is a material having well-balanced refractive index and dispersion.

As discussed above, zirconium oxide have well-balanced refractive index and dispersion, so that it is possible to prepare a wide variety of materials having the optical characteristics of a high refractive index and low dispersion, which have been difficult to achieve with conventional resin materials, by forming the composite material 10 by appropriately combining the inorganic particles 11 containing zirconium oxide with the resin substrates 12 having various refractive indices. As a result, the design flexibility of the optical component can be increased significantly.

The composite material 10 of the present invention may include an inorganic component other than zirconium oxide as the inorganic particles 11 dispersed in the resin 12, as long as the effect of the present invention can be achieved. For example, it is possible to use a composite oxide of an oxide selected from titanium oxide, zinc oxide, tantalum oxide, niobium oxide, tungsten oxide, indium oxide, tin oxide, hafnium oxide, cerium oxide, yttrium oxide, barium titanate, silica, alumina and the like with zirconium oxide. It is also possible to use an oxide obtained by doping a composite oxide containing zirconium oxide and zirconium oxide with a metallic element. It is also possible to use, together with zirconium oxide, a metal nitride such as silicon nitride (d-line refractive index: 1.9 to 2.0), a metal carbide such as silicon carbide (d-line refractive index: 2.6), and a carbon compound having light transmission, such as diamond (d-line refractive index: 3.0) and a diamond-like carbon (d-line refractive index: 3.0), for example. It is also possible to use a sulfide such as copper sulfide or tin sulfide, and a metal material such as gold, platinum, palladium, silver, copper or nickel.

In order to ensure high light transmission and to obtain a composite material having a high refractive index and low dispersion, it is preferable that the resin 12 serving as the substrate of the composite material 10 of the present invention has light transmission and that its d-line refractive index is in the range of 1.4 to 1.7.

As the resin 12, it is possible to use resins having high light transmission selected from thermoplastic resins, thermosetting resins, and energy ray-curable resins, for example. For example, it is possible to use acrylic resins; methacrylic resins such as polymethyl methacrylate; epoxy resins; polyester resins such as polyethylene terephthalate, polybutylene terephthalate and polycaprolactone; polystyrene resins such as polystyrene; olefin resins such as polypropylene; polyamide resins such as nylon; polyimide resins such as polyimide and polyether imide; polyvinyl alcohol; butyral resins; vinyl acetate resins; and alicyclic polyolefin resins. It is also possible to use engineering plastics such as polycarbonate, liquid crystal polymers, polyphenylene ether, polysulfone, polyether sulfone, polyalylate and amorphous polyolefin. Further, it is possible to use mixtures and copolymers of these resins (polymers). Further, it is also possible to use products obtained by modifying these resins.

Among these, acrylic resins, methacrylic resins, epoxy resins, polyimide resins, butyral resins, polyolefin and polycarbonate resins have high transparency and good moldability. The d-line refractive indices of these resins can be in the range of 1.4 to 1.7 by selecting a predetermined molecular framework.

Although there is no particular limitation with respect to the Abbe's number $V_m$ of the resin 12, needless to say, the Abbe's number $\nu_{COM}$ of the composite material 10, which is obtained by dispersing the inorganic particles 11, also improves with an increase in the Abbe's number $v_m$ of the resin 12 serving as the substrate. Particularly, using a resin having an Abbe's number $v_m$ of not less than 45 as the resin 12 is preferable, since this makes it possible to obtain a composite material having optical characteristics that are suitable to be applied to an optical component, such as a lens, having an Abbe's number $v_{COM}$ of not less than 40. Examples of the resin having an Abbe's number $v_m$ of not less than 45 include a resin having an alicyclic hydrocarbon group in the framework, a resin having a siloxane structure, including, for example, a polysiloxane-based resin, and a resin having a fluorine atom in the basic framework. However, there is of course no limitation to these. Among them, resins having an alicyclic hydrocarbon group have the optical characteristics of well-balanced refractive index and dispersion, and are therefore particularly preferable as the resin 12.

The resin 12 may be selected in consideration of such characteristics as moldability, film-forming capability, adhesion to the substrate and environmental resistance, depending on the optical component for which the composite material 10 is used, in addition to the above-described optical characteristics. Further, the resin 12 may be selected also taking the dispersibility of the inorganic particles 11 into consideration.

In particular, using an energy ray-curable resin having at least one selected from the group consisting of a methacrylic group, an acrylic group and an epoxy group as the resin 12 is preferable, since this improves the productivity of the optical component for which the composite material 10 has been used. Examples of the energy ray used for curing include ultraviolet light, visible light and electron beams. In general, the absorption wavelengths of titanium oxide and zinc oxide, which are used for achieving high refractive index, are near 350 nm, which is in a near-ultraviolet region. Therefore, in the case of using titanium oxide or zinc oxide as the inorganic particles, and using a commonly used ultraviolet-curable resin as the energy ray-curable resin, the inorganic particles absorb ultraviolet light within the wavelength region necessary for curing (e.g., a wavelength of 365 nm), making it difficult to control the curing conditions. On the contrary, the absorption wavelength of zirconium oxide in the ultraviolet region is near 250 nm, and is significantly shifted toward the shorter wavelength side, as compared with the absorption wavelength of titanium oxide and zinc oxide. For this reason, it is easy to control the curing conditions, even in the case of using an ultraviolet-curable resin as the resin 12.

The refractive index of the composite material 10 can be estimated from the refractive indices of the inorganic particles 11 and the resin 12 based on the Maxwell Garnett theory represented by Formula (4) below, for example. By estimating each of the refractive indices at the d-line, the F line and the C line using Formula (4), it is also possible to estimate the Abbe's number of the composite material 10. Conversely, the weight ratio between the resin 12 and the inorganic particles 11 may be determined from the estimate based on this theory.

$$n_{COM\lambda}^2 = \frac{n_{p\lambda}^2 + 2n_{m\lambda}^2 + 2P(n_{p\lambda}^2 - n_{m\lambda}^2)}{n_{p\lambda}^2 + 2n_{m\lambda}^2 - P(n_{p\lambda}^2 - n_{m\lambda}^2)} n_{m\lambda}^2 \quad (4)$$

It should be noted that, in Formula (4), $n_{com\lambda}$ represents the average refractive index of the composite material at a specific wavelength $\lambda$, and $n_{p\ \lambda}$, $n_{m\lambda}$ represent the refractive indices of the inorganic particles 11 and the resin 12 at the wavelength $\lambda$, respectively. P represents the volume ratio of the inorganic particles 11 to the composite material 10 as a whole. In the case where the inorganic particles 11 absorb light, or where the inorganic particles 11 contain metal, the refractive indices in Formula (4) are calculated as the complex refractive indices. It should be noted that Formula (4) holds if $n_{p\ \lambda} \geq n_{m\ \lambda}$. If $np_{p\ \lambda} < n_{m\ \lambda}$, the refractive indices are estimated using Formula (5) below.

$$n_{COM\lambda}^2 = \frac{n_{m\lambda}^2 + 2n_{p\lambda}^2 + 2(1-P)(n_{m\lambda}^2 - n_{p\lambda}^2)}{n_{m\lambda}^2 + 2n_{p\lambda}^2 - (1-P)(n_{m\lambda}^2 - n_{p\lambda}^2)} n_{p\lambda}^2 \quad (5)$$

As mentioned earlier, for estimating the refractive index of the composite material 10 using the Maxwell Garnett theory, the calculation is made using the volume ratio of the resin 12 and the inorganic particles 11 to the composite material 10. The volume ratio of the resin 12 and the inorganic particles 11 can be converted from the weight ratio of the components, using the density values (zirconium oxide: 5.9, silica: 2.2, alumina: 3.8, the density of the resin differs depending on the structure) of the components. For example, in the case of a composite material 10 in which 50 wt % zirconium oxide and 20 wt % alumina are dispersed in a resin 12 having a density of 1.2, the volume ratio of the components can be calculated as follows.

Resin:

(0.3/1.2)÷(0.3/1.2+0.5/5.9+0.2/3.8)=64.5 vol %

Zirconium Oxide:

(0.5/5.9)÷(0.3/1.2+0.5/5.9+0.2/3.8)=21.9 vol %

Alumina:

(0.2/3.8)÷(0.3/1.2+0.5/5.9+0.2/3.8)=13.6 vol %

The actual refractive index of the composite material 10 can be evaluated by forming or molding the prepared composite material 10 into a thickness corresponding to the measurement method (described below), and actually measuring the resulting product, for example, by a spectroscopic measurement method such as ellipsometry, an Abeles method, an optical waveguide method and a spectral reflectance method, or a prism coupler method or the like.

Depending on the conditions for the above-described refractive index measurement method, the wavelength at which the refractive index is measured may be different from the desired refractive index wavelength (e.g., the d-line, the F line and the C line) of the composite material 10. In such a case, the refractive index $n_{COM\lambda}$ at an arbitrary wavelength $\lambda$ can be estimated using Formula (6), which holds for a transparent material.

$$n_{COM\lambda}^2 = A_0 + A_1 * \lambda^2 + A_2 * \lambda^{-2} + A_3 * \lambda^{-4} + A_4 * \lambda^{-6} \quad (6)$$

More specifically, the refractive index is measured at two or more arbitrary wavelengths, and then a coefficient $A_i$ is calculated by substituting the obtained refractive indices of the composite material 10 and the wavelength at the time of the measurement into Formula (6). Accordingly, it is possible to determine the relationship between the refractive index and the measured wavelengths, and estimate the refractive index at arbitrary wavelengths other than the wavelength at the time of the measurement. The coefficient to be calculated is determined by the number of conditions for the refractive index measurement. $A_0$ and $A_2$ may be calculated when the refractive index measurement is carried out under two conditions; $A_3$, in addition to the above coefficients, may be calculated when there are three conditions; and $A_1$ and further coefficients may be calculated as appropriate when there are four or more conditions. Naturally, the larger the number of calculated coefficients, the higher the accuracy of the estimate of the refractive indices becomes. Since the composite material 10 ensures high light transmission, Formula (6), which holds for transparent materials, can be applied.

Spectroscopic ellipsometry and a prism coupler method will be described as examples of the method for measuring the refractive index. However, these are merely examples, and the method for measuring the refractive index of the composite material 10 is not limited to these.

In the case of spectroscopic ellipsometry, a measurement sample is prepared by forming a film of the composite material 10 on a substrate having a known refractive index, such as a silicon wafer, a quartz plate and a resin plate, by spin coating or the like such that the film thickness is not more than 1 µm. By measuring this sample with a spectroscopic ellipsometer, the refractive index n and extinction coefficient k of the composite material 10 in the set wavelength range are calculated analytically based on the state of the polarized light of the sample. In the case of the refractive index measurement using ellipsometry, it is necessary to choose an optical model. For example, the Cauchy model, which is applied to a transparent material, or the Lorenz model, which is applied to a dielectric material, can be applied to the composite material 10.

In the case of the prism coupler method, a measurement sample is prepared by forming a film of the composite material 10 by spin coating, bar coating or the like on a substrate having a known refractive index such that the film thickness is not less than 2 µm, or by molding the composite material 10 into an appropriate size. By bringing this sample into a close contact with the prism of a prism coupler device, and guiding laser light therethrough, the refractive index n (and also a film thickness, if the sample is a film having a thickness of not less than 2 µm and not more than 100 µm formed on a substrate having a known refractive index) of the composite material 10 at the wavelength of the laser light is calculated based on the waveguide mode. By measuring the refractive index at plural wavelengths by changing the laser serving as the light source, it is possible to estimate the refractive index at arbitrary wavelengths using Formula (6).

In the case of using a resin having a d-line refractive index of 1.5, it is estimated that mixing zirconium oxide having a d-line refractive index of 2.1 such that its volume ratio to the composite material 10 as a whole is not less than 35% can provide a composite material having a d-line refractive index of not less than 1.7. In the case of using a resin having a d-line refractive index of 1.6, it is estimated that mixing zirconium oxide having a d-line refractive index of 2.1 such that its volume ratio to the composite material 10 as a whole is not less than 22% can provide a composite material having a d-line refractive index of not less than 1.7. Further, the refractive indices at the F line and the C line are calculated by using Formula (4) or (5) in the same manner as used for the F line and the C line, so that the Abbe's number can be estimated by substituting the obtained refractive indices into Formula (3).

Figure 6A:
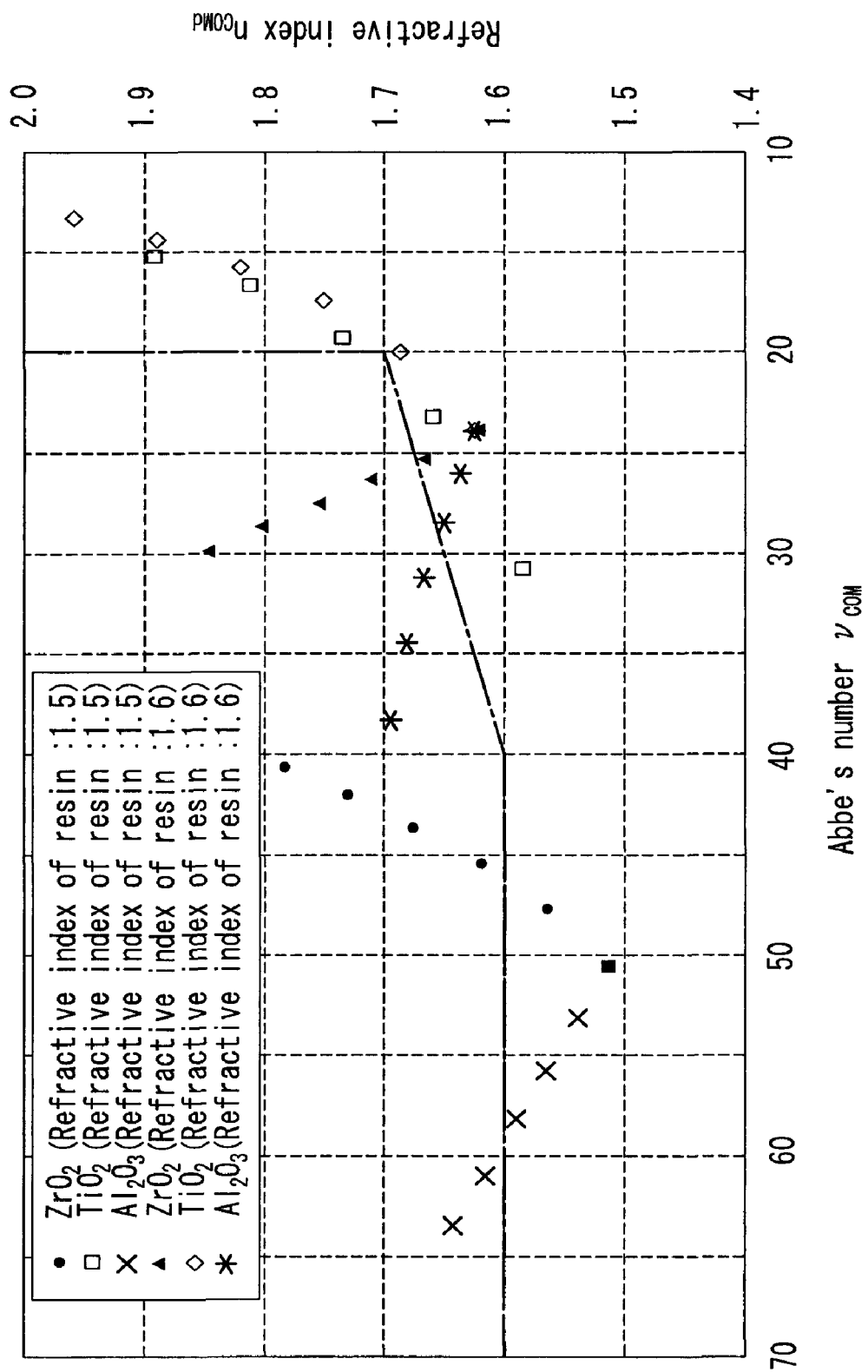
FIG. 6A is a graph illustrating the relationship between the refractive index and the Abbe's number of each of the composite materials obtained by mixing inorganic particles to two kinds of resins such that the volume ratio of the inorganic particles to the composite material as a whole is 0%, 10%, 20%, 30%, 40% or 50% in the first embodiment of the present invention.
Figure 6B:
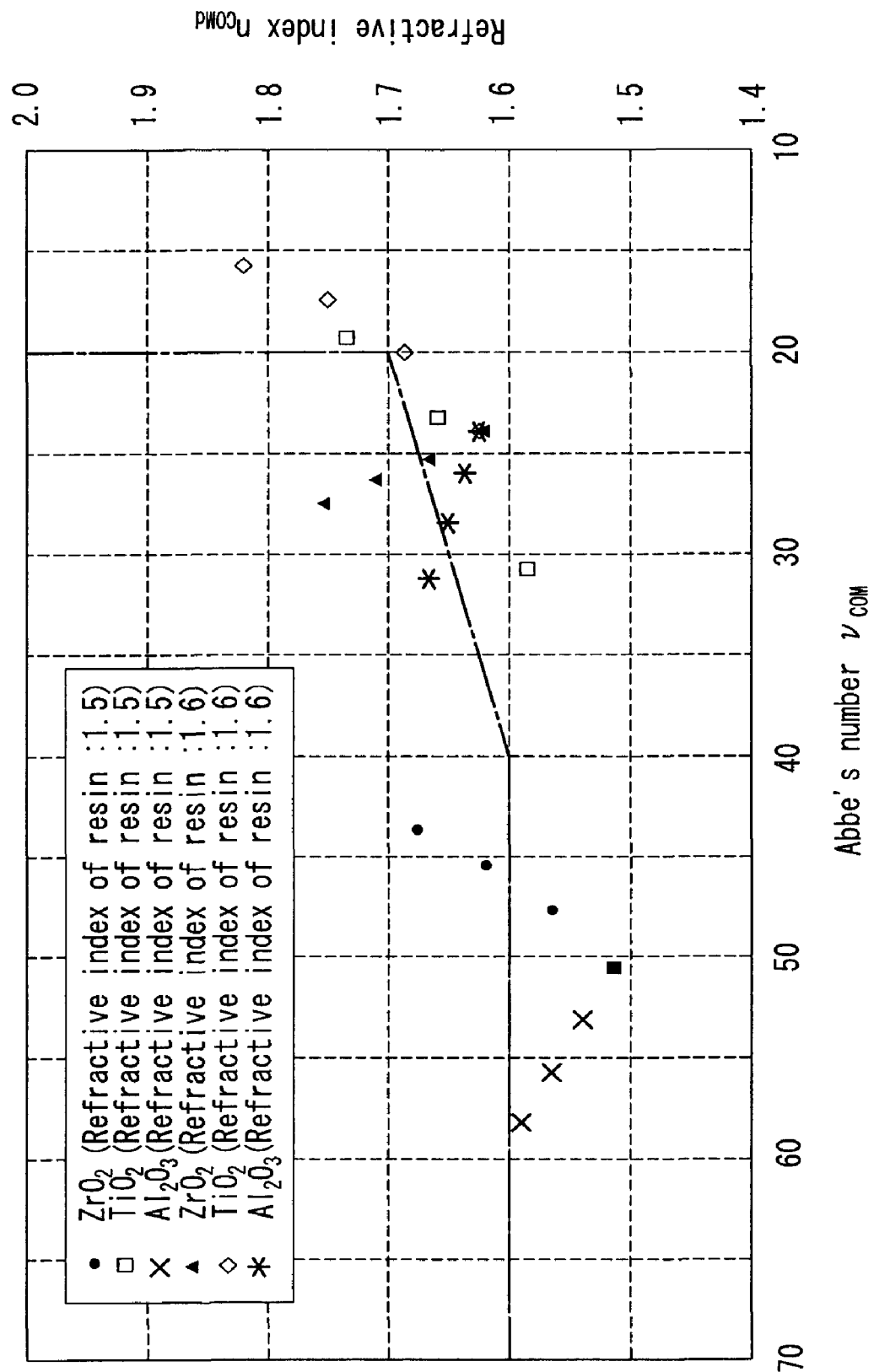
FIG. 6B is a graph illustrating the relationship between the refractive index and the Abbe's number of each of the composite materials obtained by mixing inorganic particles to two kinds of resins such that the volume ratio of the inorganic particles to the composite material as a whole is 0%, 10%, 20% or 30% in the first embodiment of the present invention.

As an example, the relationship between the d-line refractive index and the Abbe's number was calculated using Formulae (4) and (3) for the composite materials obtained by mixing zirconium oxide (d-line refractive index: 2.1, Abbe's number: 35) as the inorganic particles with two kinds of resins (a resin having a d-line refractive index of 1.5 and an Abbe's number of 50, and a resin having a d-line refractive index of 1.6 and an Abbe's number of 25) such that its volume ratio to the composite material as a whole is 0%, 10%, 20% or 30% (40%, or 50%). The densities of the two kinds of resin are both 1.2 g/cm$^3$, and the volume ratios 10%, 20%, 30%, 40% and 50% of zirconium oxide correspond to 35%, 55%, 68%, 77% and 83%, respectively, in terms of weight ratio. The calculation results of the refractive index are shown in FIGS. 6A and 6B. FIG. 6A shows the volume ratio up to 50% (weight ratio up to 83%) of the inorganic particles, and FIG. 6B shows the volume ratio up to 30% (weight ratio up to 68%) of the inorganic particles. The dash-dotted lines in FIGS. 6A and 6B denote refractive index $n_{COMd}$=1.60, Abbe's number $v_{COM}$=20 and $n_{COMd}$=1.8–0.005 $v_{COM}$. It can be said that the materials whose d-line refractive index and Abbe's number are in the upper left region from the dash-dotted lines in FIGS. 6A and 6B are the materials having a refractive index and dispersion that are better balanced than in the commonly used resin material represented by Formula (1). Using such materials makes it possible to form a small, high-performance optical component.

It should be noted that FIGS. 6A and 6B show the relationship between the d-line refractive index and the Abbe's number of the composite materials for comparison obtained by mixing and dispersing titanium oxide (d-line refractive index: 2.61, Abbe's number: 12) and alumina (d-line refractive index: 1.74, Abbe's number: 76) in the same manner.

As shown in FIGS. 6A and 6B, the refractive index of the composite materials increases as the volume ratio of zirconium oxide increases. As shown in FIGS. 6A and 6B, dispersing the first inorganic particles 11 containing zirconium oxide in the resin 12 makes it possible to obtain a composite material 10 exhibiting both a high refractive index and low dispersion in good balance. The inorganic particles made of zirconium oxide also give advantages in terms of, for example, the light transmission and moldability of the composite material, since it is necessary to add only a small amount of the inorganic particles that are to be dispersed in order to obtain a composite material exhibiting both a high refractive index and low dispersion, as compared with the inorganic particles made of alumina.

Second Embodiment

Figure 7:
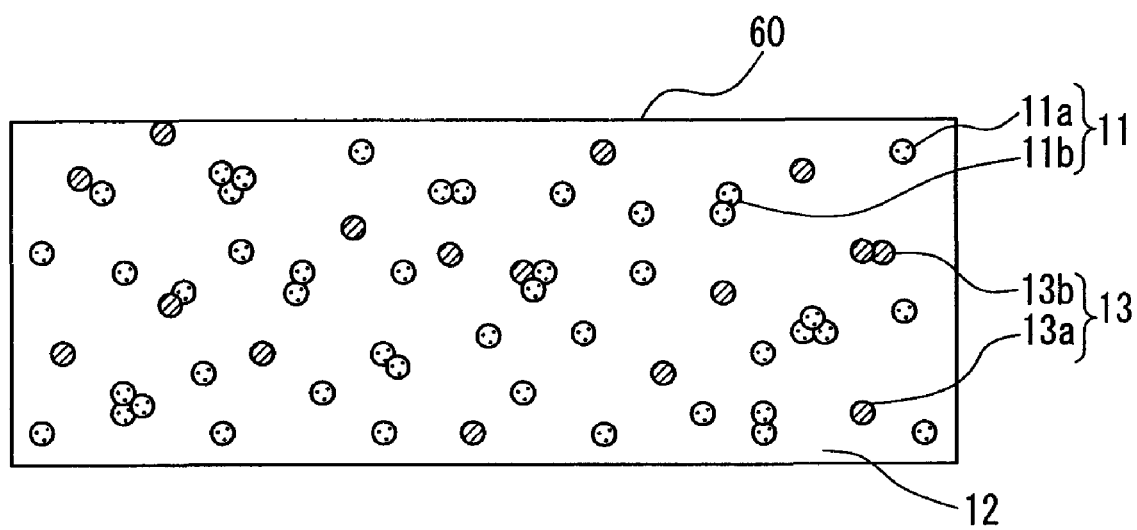
FIG. 7 is a cross-sectional view schematically showing a composite material according to a second embodiment of the present invention.

A composite material according to the second embodiment of the present invention will be described with reference to FIG. 7.

A composite material 60 according to the second embodiment of the present invention is formed by uniformly dispersing first inorganic particles 11 containing at least zirconium oxide and second inorganic particles 13 having a composition different from that of the first inorganic particles 11 and having an Abbe's number $v_P$ of not less than 50 in a resin 12 serving as the substrate. Similarly to the first inorganic particles 11, the second inorganic particles 13 generally include primary particles 13a and secondary particles 13b, which are formed by a plurality of aggregated primary particles 13a. Accordingly, the first inorganic particles 11 and second inorganic particles 13 being uniformly dispersed in the resin 12 means that the primary particles 11a and the secondary particles 11b of the inorganic particles 11 and the primary particles 13a and secondary particles 13b of the second inorganic particles 13 are substantially uniformly dispersed in the composite material 60, without being unevenly distributed in any particular position in the composite material 60. For the same reason for the first inorganic particles 11, the effective particle diameter of the second inorganic particles 13 is preferably in the range of not less than 1 nm and not more than 100 nm, and more preferably are in the range of not less than 1 nm and not more than 50 nm.

As for the resin 12 serving as the substrate, it is possible to use the same materials as those described in the first embodiment. This also applies to the following embodiments.

Although the Maxwell Garnett theory shown in Formula (5) described above originally holds for binary systems, the refractive index of a ternary composite material in which two kinds of inorganic particles are dispersed in a resin can be estimated to a certain degree by using Formulae (7) and (8), which are derived from Formula (4).

$$n_{CB\lambda}^2 = \frac{n_{pB\lambda}^2 + 2n_{m\lambda}^2 + 2P_B(n_{pB\lambda}^2 - n_{m\lambda}^2)/(P_B + P_m)}{n_{pB\lambda}^2 + 2n_{m\lambda}^2 - P_B(n_{pB\lambda}^2 - n_{m\lambda}^2)/(P_B + P_m)} n_{m\lambda}^2 \quad (7)$$

$$n_{COM\lambda}^2 = \frac{n_{pA\lambda}^2 + 2n_{CB\lambda}^2 + \frac{2P_A(n_{pA\lambda}^2 - n_{CB\lambda}^2)}{(P_A + P_B + P_m)}}{n_{pA\lambda}^2 + 2n_{CB\lambda}^2 - \frac{P_A(n_{pA\lambda}^2 - n_{CB\lambda}^2)}{(P_A + P_B + P_m)}} n_{CB\lambda}^2 \quad (8)$$

In Formula (7), $n_{CB\lambda}$ represents the refractive index at a specific wavelength λ of the composite material in which the second inorganic particles 13 are singly dispersed in the resin 12, $n_{pB\lambda}$ represents the refractive index at this wavelength λ of the second inorganic particles 13. $P_m$ and $P_B$ represent the volume ratios of the resin 12 and the second inorganic particles 13, respectively, to the composite material 10 as a whole. Formula (7) holds if $n_{pB\lambda} \geq n_{pm\lambda}$. If $n_{pB\lambda} < n_{pm\lambda}$, the refractive index of the composite material 10 is estimated by modifying Formula (7) in the same manner as with Formula (5).

In Formula (8), $n_{pA\lambda}$ represents the refractive index at the above-described wavelength λ of the first inorganic particles 11. $P_A$ represents the volume ratio of the first inorganic particles 11 to the composite material 10 as a whole. In the case where the composite material 10 is composed only of three components, namely, the resin 12, the first inorganic particles 11 and the second inorganic particles 13, $P_A+P_B+P_m=1$. Formula (8) holds if $n_{pA\lambda} \geq n_{CB\lambda}$. If $n_{pA\lambda} < n_{CB\lambda}$, the refractive index of the composite material 10 is estimated by modifying Formula (8) in the same manner as with Formula (5).

As an example, the relationship between the d-line refractive index and the Abbe's number was calculated using Formulae (7) and (8) for the composite materials obtained by mixing zirconium oxide (d-line refractive index: 2.1, Abbe's number: 35) and alumina (d-line refractive index: 1.74, Abbe's number: 76) or silica (d-line refractive index: 1.46, Abbe's number: 68) as the inorganic particles with two kinds of resins (a resin having a d-line refractive index of 1.5 and an Abbe's number of 50, and a resin having a d-line refractive index of 1.6 and an Abbe's number of 25, each having a density of 1.2) such that the total volume ratio of the inorganic particles to the composite material as a whole is 0%, 10%, 30% or 50%. The volume ratio between zirconium oxide and alumina or silica was varied as follows: 10:0, 8:2, 6:4, 5:5, 4:6, 2:8 and 1:9. The relationship between the volume ratio and the weight ratio of the resin, zirconium oxide and alumina or silica are as shown in Tables 1 and 2 below.

TABLE 1

| Total volume ratio of inorganic particles | Volume ratio between $ZrO_2$ and $Al_2O_3$ | Weight ratio of resin | Weight ratio of $ZrO_2$ | Weight ratio of $Al_2O_3$ |
|---|---|---|---|---|
| 0% | — | 100% | 0% | 0% |
| 10% | 10:0 | 65% | 35% | 0% |
| | 8:2 | 66% | 29% | 5% |
| | 6:4 | 68% | 22% | 10% |
| | 5:5 | 69% | 19% | 12% |
| | 4:6 | 70% | 15% | 15% |
| | 2:8 | 72% | 8% | 20% |
| | 1:9 | 73% | 4% | 23% |
| 30% | 10:0 | 32% | 68% | 0% |
| | 8:2 | 34% | 57% | 9% |
| | 6:4 | 36% | 45% | 19% |
| | 5:5 | 37% | 39% | 25% |
| | 4:6 | 38% | 32% | 31% |
| | 2:8 | 40% | 17% | 43% |
| | 1:9 | 41% | 9% | 50% |
| 50% | 10:0 | 17% | 83% | 0% |
| | 8:2 | 18% | 71% | 11% |
| | 6:4 | 19% | 57% | 24% |
| | 5:5 | 20% | 49% | 31% |
| | 4:6 | 21% | 40% | 39% |
| | 2:8 | 22% | 22% | 56% |
| | 1:9 | 23% | 11% | 66% |

TABLE 2

| Total volume ratio of inorganic particles | Volume ratio between $ZrO_2$ and $SiO_2$ | Weight ratio of resin | Weight ratio of $ZrO_2$ | Weight ratio of $SiO_2$ |
|---|---|---|---|---|
| 0% | — | 100% | 0% | 0% |
| 10% | 10:0 | 65% | 35% | 0% |
| | 8:2 | 68% | 30% | 3% |
| | 6:4 | 71% | 23% | 6% |
| | 5:5 | 73% | 20% | 7% |
| | 4:6 | 75% | 16% | 9% |
| | 2:8 | 79% | 9% | 13% |
| | 1:9 | 81% | 4% | 15% |
| 30% | 10:0 | 32% | 68% | 0% |
| | 8:2 | 35% | 59% | 6% |
| | 6:4 | 39% | 49% | 12% |
| | 5:5 | 41% | 43% | 16% |
| | 4:6 | 43% | 36% | 20% |
| | 2:8 | 49% | 21% | 31% |
| | 1:9 | 52% | 11% | 37% |
| 50% | 10:0 | 17% | 83% | 0% |
| | 8:2 | 19% | 74% | 7% |
| | 6:4 | 21% | 63% | 16% |
| | 5:5 | 23% | 56% | 21% |
| | 4:6 | 25% | 48% | 27% |
| | 2:8 | 29% | 29% | 43% |
| | 1:9 | 32% | 16% | 53% |

Figure 8:
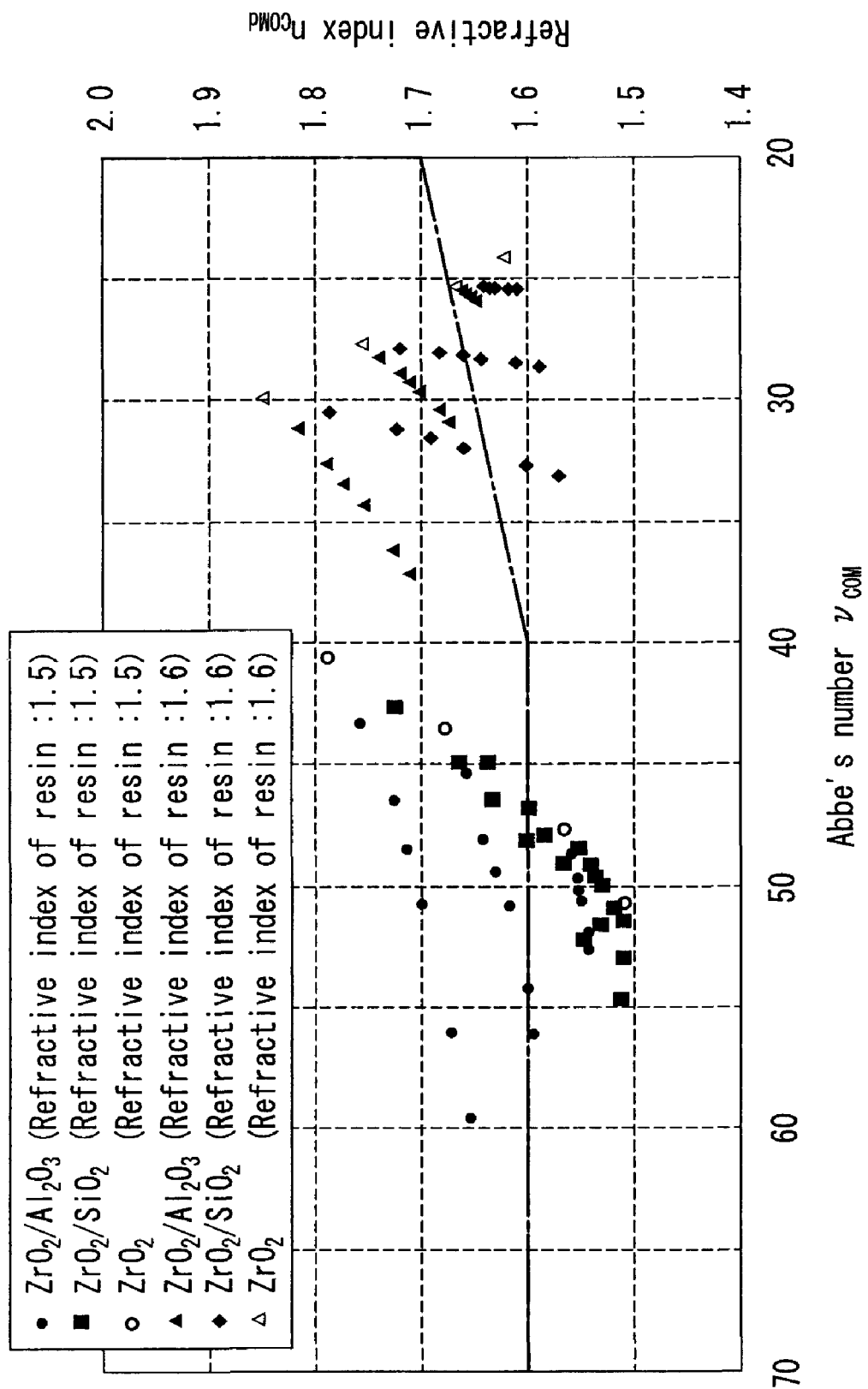
FIG. 8 is a graph illustrating the relationship between the refractive index and the Abbe's number of each of the composite materials obtained by mixing two kinds of inorganic particles to two kinds of resins such that the total volume ratio of the inorganic particles to the composite material as a whole is 0%, 10%, 20%, 30%, or 50% in the second embodiment of the present invention.

The calculation results for the refractive index are shown in FIG. 8. The dash-dotted line in FIG. 8 is the same as that in FIG. 6A and FIG. 6B.

As shown in FIG. 8, the refractive index of the composite material increases as the volume ratio of the inorganic particles increases. Further, the larger the volume ratio of zirconium oxide in the inorganic particles, the higher the refractive index of the composite material becomes. However, the Abbe's number decreases on the contrary. As shown in FIG. 8, it is possible to suppress a decrease of the Abbe's number of the composite material 60 even further by allowing the coexistence of particles having lower dispersion, for example, having an Abbe's number $v_p$ of not less than 50, than that of zirconium oxide as the second inorganic particles 13 with the first inorganic particles 11 containing zirconium oxide in the resin 12. From FIG. 5, it seems that a material whose band gap is not less than about 6 to 7 eV exhibits an Abbe's number $v_p$ of not less than 50. Examples of inorganic particles corresponding to the aforementioned materials include: metal oxides such as silica (band gap: 9.7 eV), alumina (band gap: 7.4 to 9 eV, depending on the crystal system), magnesium oxide (band gap: 7.8 eV) and calcium oxide (band gap: 7.1 eV); metal nitrides such as aluminum nitride (band gap: 6.2 eV); and metal halides such as calcium fluoride (band gap: 11.5 eV) and potassium chloride (band gap: 10.9 eV).

It is preferable to allow the coexistence of the second inorganic particles 13 containing at least one of silica and alumina with the first inorganic particles 11 containing zirconium oxide in the resin 12 since this makes it possible to suppress a decrease of the Abbe's number of the composite material 60 as described above, has a relatively small effect on, for example, the durability of the resin 12 serving as the substrate, and makes it possible to reduce the manufacturing cost of the composite material 60 because of the availability and the ease of preparation of the inorganic particles.

As discussed above, allowing the coexistence of zirconium oxide having well-balanced refractive index and dispersion with the second inorganic fine particles having low dispersion in the resin enables easy adjustment of the refractive index and the Abbe's number, without increasing the dispersion, whereby the design flexibility of the optical component is increased further.

In addition, as with the composite material 10 according to the first embodiment, the first inorganic particles 11 dispersed in the resin 12 in the composite material 60 according to the present invention may contain inorganic components other than zirconium oxide, as long as the effect of the present invention can be achieved. The second inorganic particles 13 also may contain inorganic components other than the above-described metal oxides, metal nitrides and metal halides, as long as their Abbe's number $v_p$ is not less than 50. Further, the second inorganic particles 13 may contain inorganic components other than silica and alumina.

Next, the composite materials 10 and 60 according to the first and second embodiments of the present invention will be described. A preferable weight ratio of the inorganic particles to the composite material 10 and 60 as a whole may differ depending on the combination of the resin 12 and the inorganic particles, and the optical component for which the composite materials are used. Since the light transmission decreases when the ratio of the inorganic particles is too large, the upper limit of the weight ratio of the inorganic particles to the composite material as a whole usually is about 85 wt % to 95 wt % (corresponding to 50 vol % to 80 vol % in volume ratio). In order to realize a high refractive index and high light transmission, the total weight ratio of the first and second inorganic particles to the composite material as a whole preferably is in the range of 5 wt % to 85 wt % (corresponding to about 1 vol % to about 50 vol % in volume ratio). When the weight ratio of the inorganic particles to the composite material as a whole is less than 5 wt %, the refractive index and Abbe's number of the composite material cannot be controlled sufficiently with the inorganic particles. On the other hand, when the weight ratio of the inorganic particles is more than 85 wt %, the light transmission of the composite material is reduced owing to scattering, and the amount of the resin serving as the binder is insufficient. Accordingly, the optical component for which the composite material has been used will hardly satisfy the mechanical characteristics, moldability, long-term stability and the like. In particular, a composite material in which the total weight ratio of the first and second inorganic particles is in the range of 50 wt % to 85 wt % (corresponding to about 16 vol % to about 50 vol % in volume ratio) is preferable since it provides a sufficiently improved refractive index as compared with a composite material composed only of the resin, and enables further reduction in the thickness and size of the optical component for which it is used. Although there is the risk that the increase of the weight ratio of the inorganic particles to the composite material as a whole may reduce the moldability, it is possible to use even a composite material having a large weight ratio of the inorganic particles for an optical component by selecting the optical component and optimizing the process, for example, by forming a film on a small component by a coating process.

With the composite materials 10 and 60 of the present invention, it is possible to obtain an optical component material that satisfies Formula (2), which has been difficult to achieve with the use of a resin alone, by dispersing, in the resin 12, the first inorganic particles 11 containing zirconium oxide and having well-balanced refractive index and dispersion, and the second inorganic fine particles 13 having low dispersion.

$$n_{COMd} \geq 1.8 - 0.005\, v_{COM} \qquad (2)$$

Although there is no particular limitation with respect to the refractive index of the composite materials 10 and 60 of the present invention as long as Formula (2) is satisfied, it is preferable that the d-line refractive index $n_{COMd}$ is not less than 1.60 in order to satisfy the characteristics required for the optical component and realizing the reduction in thickness and size of the optical component. From Formulae (4), (7) and (8), the theoretical upper limit of the d-line refractive index $n_{COMd}$ of the composite materials 10 and 60 is 2.1, which is the d-line refractive index of zirconium oxide. However, as noted above, the total weight ratio of the first inorganic particles 11 and second inorganic particles 13 to the composite materials 10 and 60 preferably is not more than 85 wt % (corresponding to about 50 vol % in volume ratio), and the d-line refractive index of the resin 12 serving as the substrate is approximately not more than 1.7. Therefore, it seems that the actual upper limit of the d-line refractive index $n_{COMd}$ of the composite materials 10 and 60 is about 1.9.

Although there is no particular limitation with respect to the Abbe's number $v_{COM}$ of the composite materials 10 and 60 according to the present invention as long as Formula (2) is satisfied, the Abbe's number $v_{COM}$ preferably is not less than 20 from the viewpoint of improving the characteristics required for the optical component, especially, the chromatic aberration or the like of the lens. From Formulae (7) and (8), the theoretical upper limit of the Abbe's number $v_{COM}$ of the composite materials 10 and 60 is the Abbe's number of the second inorganic particles 13 having low dispersion (e.g., 76 of alumina). However, as noted above, the total weight ratio of the first inorganic particles 11 and second inorganic particles 13 to the composite materials 10 and 60 preferably is 85 wt % (corresponding to about 50 vol % in volume ratio), and the Abbe's number of the resin 12 serving as the substrate is approximately not more than 70. Therefore, it seems that the actual upper limit of the Abbe's number $v_{COM}$ of the composite materials 10 and 60 is about 70.

Figure 9:
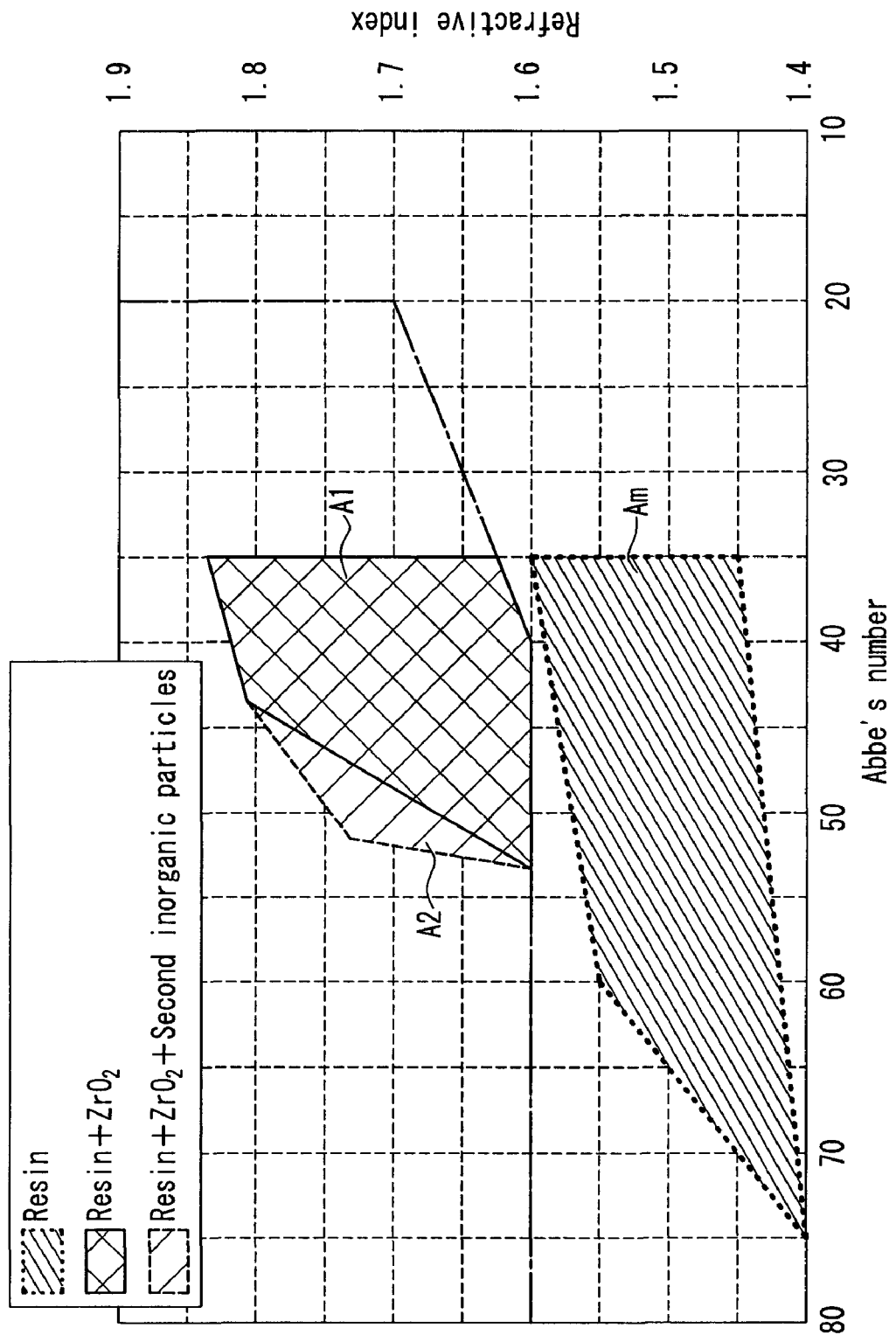
FIG. 9 shows a preferable range of the d-line refractive index and Abbe's number of the resin and the composite material of the present invention.

As shown in FIG. 9, when nm represents the d-line refractive index of the resin and $v_m$ represents the Abbe's number thereof in a two-dimensional coordinate system in which the vertical axis denotes a refractive index at the d-line and the horizontal axis denotes an Abbe's number, if the point ($n_m$, $v_m$) is located in the region Am enclosed by the dotted line connecting in order the point (1.4, 75), the point (1.55, 60), the point (1.6, 35) and the point (1.45, 35), then a composite material can be obtained that has a high d-line refractive index $n_{COMd}$ of not less than 1.60 and a high Abbe's number $v_{COM}$ of not less than 35, which has been particularly difficult to achieve with conventional organic optical materials. Although there is no particular limitation with respect to the resin whose d-line refractive index $n_m$ and Abbe's number $v_m$ are located in the region Am, it is preferable to use an energy ray-curable resin having at least one selected from the group consisting of a methacrylic group, an acrylic group and an epoxy group, since the productivity of the optical component for which the composite materials 10 and 60 have been used improves. Among them, a resin having at least one selected from the group consisting of an alicyclic hydrocarbon group, a siloxane structure and a fluorine atom is particularly preferable, since it has a high Abbe's number, and thus improves the Abbe's number $v_{COM}$ of the composite materials 10 and 60.

It is preferable that the point ($n_{COMd}$, $v_{COM}$) representing the d-line refractive index $n_{COMd}$ and the Abbe's number $v_{COM}$ of the composite material 10 containing the resin 12 and the first inorganic particles 11 is located in the region A1 enclosed by the solid line connecting in order the point (1.6, 40), the point (1.6, 53), the point (1.81, 43), the point (1.84, 35) and the point (1.625, 35). Further, the point ($n_{COMd}$, $v_{COM}$) representing the d-line refractive index $n_{COMd}$ and the Abbe's number $v_{COM}$ of the composite material 60 containing the resin 12 and the first inorganic particles 11 and second inorganic particles 13 is located in the region A2 enclosed by the dashed line connecting in order the point (1.6, 40), the point (1.6, 53), the point (1.73, 52), the point (1.81, 43), the point (1.84, 35) and the point (1.625, 35). If the d-line refractive index $n_{COMd}$ and the Abbe's number $v_{COM}$ are located in the above-described regions A1 and A2, then use of the composite materials 10 and 60 for an optical component can improve the chromatic aberration in particular, so that it is possible to use the materials 10 and 60 for optical components, such as a lens or a prism, that have not exhibited sufficient characteristics with conventional organic optical materials. Particularly, with the composite material 60 containing the second inorganic particles 13 having a high Abbe's number, it is possible to realize an even higher Abbe's number $v_{COM}$.

The dash-dotted line in FIG. 9 is the same as that in FIGS. 6A and 6B.

A composite material that is located in the region located below the line connecting in order the point (1.6, 53), the point (1.6, 40) and the point (1.625, 35) has a refractive index that is not sufficiently high, and therefore has little effect of reducing the thickness and the size of the optical component.

On the contrary, in order to realize a composite material that is located in the region located above the line connecting in order the point (1.73, 52), the point (1.81, 43) and the point (1.84, 35), it is necessary to increase the weight ratio of the first inorganic particles and second inorganic particles to the composite material as a whole. Accordingly, the light transmission is reduced owing to scattering, and insufficiency of the resin component serving as the binder causes reduced mechanical characteristics, moldability and long-term stability.

A composite material that is located in the region located on the right side of the line connecting the point (1.84, 35) and the point (1.625, 35), or in other word, whose Abbe's number $v_{COM}$ is not more than 35 increases the chromatic aberration when used for an optical component, and therefore can be used for only limited types of optical components.

On the other hand, when a resin having a high Abbe's number located in the region located on the left side of the line connecting the point (1.4, 75) and the point (1.55, 60) is employed in an attempt to increase the Abbe's number of the composite material, such a resin does not have a sufficiently high refractive index since there is a correlation between the refractive index and Abbe's number of the resin 10, as shown in Formula (1). Accordingly, the refractive index of the composite material to which the inorganic particles containing zirconium oxide have been added also does not improve. For the above-described reason, it is difficult to realize a composite material that is located in the region located on the left side of the line connecting the point (1.6, 53) and the point (1.73, 52).

Further, the composite materials 10 and 60 according to the present invention have excellent workability since the substrate is made of the resin 12. The composite materials 10 and 60 also have the characteristic that they undergo little deterioration due to the temperature changes since the inorganic particles 11 containing zirconium oxide, which has a smaller thermal expansion coefficient than that of the resin 12, are dispersed therein.

Next, a method for preparing the composite material according to the present invention will be described below.

There is no particular limitation with respect to the method for preparing the above-described composite materials 10 and 60, which are obtained by dispersing the inorganic particles 11 and 13 in the resin 12 serving as the substrate. The composite materials 10 and 60 may be prepared by a physical method, or may be prepared by a chemical method. For example, the composite materials may be prepared by any of the following methods.

Method (1): a resin or a solution in which a resin is dissolved is mechanically/physically mixed with inorganic particles.

Method (2): a raw material of a resin (monomer, oligomer or the like) is mechanically/physically mixed with inorganic particles to obtain a mixture, and thereafter, the raw material of the resin is polymerized.

Method (3): a resin or a solution in which a resin is dissolved is mixed with the raw material of inorganic particles, and thereafter, the raw material of the inorganic particles is caused to react to form the inorganic particles in the resin.

Method (4): after a raw material of a resin (monomer, oligomer or the like) is mixed with a raw material of inorganic particles, the following steps are carried out: a step of causing the raw material of the inorganic particles to react, thereby synthesizing the inorganic particles; and a step of polymerizing the raw material of the resin, thereby synthesizing the resin.

When the inorganic particles are made of zirconium oxide, examples of the raw material of the inorganic particles of the composite material according to the present invention include zirconium alkoxide (e.g., zirconium tetraethoxide, zirconium tetra-i-propoxide, zirconium tetra-n-propoxide, zirconium tetra-n-butoxide, zirconium tetra-sec-butoxide, and zirconium tetra-tert-butoxide), zirconium chelate compounds (e.g., bisacetylacetone zirconium and tri-n-butoxide zirconium monoethylacetoacetate), and zirconyl ammonium carbonate. In addition to these raw materials of zirconium oxide particles, it is also possible to use other raw materials of inorganic particles, including, for example, organic metal compounds containing alkoxide or a coordination compound, and metal chlorides. When the inorganic particles are silica, examples of the raw material include alkoxysilane (e.g., tetraethoxysilane, tetra-i-propoxysilane, tetra-n-propoxysilane, tetra-n-butoxysilane, methyltriethoxysilane, methyltrimethoxysilane, vinyltriethoxysilane, vinyltrimethoxysilane and dimethyldiethoxysilane) and silicon halide (e.g., tetrachlorosilane, methyltrichlorosilane and ethyltrichlorosilane). When the inorganic particles are alumina, examples of the raw material include aluminum alkoxide (e.g., aluminum triethoxide, aluminum tri-i-propoxide and aluminum tributoxide) and chelate compounds (e.g., aluminum acetylacetonate).

Methods (1) and (2) described above have an advantage in that various inorganic particles that have been formed in advance can be used, and that composite materials can be prepared by a general purpose dispersing device. On the other hand, Methods (3) and (4) described above impose limitations on the materials since chemical reactions are necessary. However, these methods mix the raw material at the molecular level, and therefore have an advantage in that the dispersibility of the inorganic particles can be improved.

In the case of allowing the coexistence of the second inorganic particles 13 of low dispersion with the first inorganic particles 11 containing zirconium oxide in the resin 12, both kinds of the particles may be prepared by the same method, or different methods selected from Methods (1) to (4) above. For example, one kind of the particles may be mixed as inorganic particles that have been formed in advance, and the other kind of particles may be formed from their raw material.

In the above-described methods, there is no particular limitation with respect to the order in which inorganic particles or the raw material of the inorganic particles is mixed with a resin or the raw material of the resin, and a preferable order may be selected as appropriate. For example, a resin, a raw material of the resin or a solution in which the resin or the raw material thereof are dissolved may be added to a solution in which inorganic particles whose primary particle diameter substantially is in the range of 1 nm to 100 nm are dissolved, and the whole may be mixed mechanically/physically. In the case of allowing the coexistence of the second inorganic particles 13 of low dispersion with the first inorganic particles 11 containing zirconium oxide in the resin, there is also no particular limitation with respect to the order in which the inorganic particles are prepared, as long as the effect of the present invention can be achieved. For example, in the case of using alkoxide as the raw material of the inorganic particles in Methods (3) and (4) above, alkoxy silane or aluminum alkoxide, each of which has relatively low reactivity, may be caused to react first for a certain period of time, and then zirconium alkoxide, which has high reactivity, may be mixed with this system further and caused to react.

It should be noted that the composite materials 10 and 60 according to the present invention may contain a component other than the inorganic particles 11 and 13 and the resin 12 serving as the substrate, as long as the effect of the present invention can be achieved. Although not shown in the drawings, a dispersing agent or surfactant that improves the dispersibility of the inorganic particles 11 and 13 in the resin 12, and a dye or pigment that absorbs electromagnetic waves in a specific range of wavelengths, for example, may also be included in the composite materials 10 and 60.

The method for processing the composite materials 10 and 60 used for forming an optical component according to the present invention may differ depending on, for example, the kinds of the resin 12 serving as the substrate, and the shape, and required properties of the optical component that is to be formed. For example, in the case of obtaining a molded product such as a lens substrate, a disk substrate or fiber made of the composite materials 10 and 60, if the resin is a thermoplastic resin, then the composite material can be softened or melted by being heated to a certain temperature range, and the resulting product may be subjected to various molding processes. Examples of the molding method include, extrusion molding, injection molding, vacuum molding, blow molding, compression molding, calendaring molding, laminate molding and heat pressing, and it is possible to obtain molded products having various shapes. If the resin is a thermosetting resin or a photo-curable resin, then it is possible to obtain a molded product made of the composite material according to the present invention, for example, by a method (cast polymerization) in which inorganic particles or a raw material of the inorganic particles are mixed with a monomer, an oligomer or the like serving as a raw material of the resin, and the mixture is subjected to casting in their mixed state, and the raw material of the resins is polymerized by heating and/or energy ray irradiation. As necessary, these molded products may be processed by cutting or polishing, or subjected to surface treatment with a hard coat or an antireflection film.

On the other hand, when a coating film on the surface of the molded product or an optical waveguide in its pores is formed of the composite materials 10 and 60, it is possible to use a mixture such as an application liquid containing the substances for forming the composite materials. This mixture (application liquid) may contain a resin or a raw material of the resin, and inorganic particles and a solvent (dispersion medium). Alternatively, it is possible to use a mixture that does not contain a solvent. In this case, a thermoplastic resin is used, and it is possible to use a mixture whose viscosity is reduced by temperature rise, or a film-like mixture. The application liquid may be prepared, for example, by the following methods.

Method (1): an application liquid is prepared by diluting the composite material with a solvent. In the case of using this application liquid, the solvent is removed after application of the application liquid.

Method (2): an application liquid is prepared by mixing a monomer, an oligomer or a low molecular weight component of a resin is mixed with inorganic particles. In the case of using this application liquid, it is necessary to cause the raw material such as a monomer, an oligomer or lower molecular weight component to react, thereby synthesizing the resin. The timing of performing this synthesis may be determined in accordance with the subsequent step.

Method (3): an application liquid is prepared by mixing a raw material of inorganic particles, a resin and a solvent. In the case of using this application liquid, after application of the application liquid, the raw material of the inorganic particles is caused to react by a sol-gel method or the like, thereby synthesizing the inorganic particles in the applied film.

Method (4): an application liquid is prepared by dispersing inorganic particles in a resin whose viscosity has been reduced by heating. With this method, the applied film is solidified as the temperature of the coating film decreases, whereby a coating film or an optical waveguide is formed.

These methods may be selected appropriately, for example, according to the kind of the resin 12 and the inorganic particles 11 and 13, and the application method thereof. It should be noted that the application liquid may contain, for example, a cross-linking agent, a polymerization initiator and a dispersing agent, as needed.

There is no particular limitation with respect to the method for disposing this application liquid on the surface or in the pores of the molded product. For example, it is possible to use known methods. More specifically, the following are applicable: application using an injection nozzle of a dispenser or the like; a jetting application such as the ink jet method; application by rotation, such as spin coating; application by squeezing, such as printing; and transferring. Such a method can be performed using existing facilities.

After application of the application liquid, the coating film or the optical waveguide can be formed by removing the solvent, as necessary. It should be noted that in the case where the application liquid contains a raw material of a resin (monomer, oligomer or the like) or a raw material of inorganic particles, they may be caused to react after application, as necessary, thereby synthesizing the resin or the inorganic particles. The coating film or the optical waveguide also may be formed by curing the film that has been formed by application of the application liquid. The curing process can be performed, for example, by energy ray (ultraviolet light, visible light, electron beams) irradiation, heating, or drying, for example.

Third Embodiment

One embodiment of the optical component using the composite material according to the present invention will be described with reference to FIG. 10.

In the present invention, examples of the optical component that can be formed using the composite material in which inorganic particles containing at least zirconium oxide are dispersed in a resin include a lens, a diffractive optical element (e.g., a lens, a spatial low-pass filter or a polarizing hologram in which a diffraction grating is formed,), a solid-state image sensor including an optical waveguide, optical fiber, an optical disk substrate, an optical filter and an optical adhesive. Among these, FIG. 10 is a cross-sectional view showing an example of a lens in which a diffraction grating pattern is formed on its surface. It should be noted that the lens shown in FIG. 10 is merely an example, and the present invention is applicable to various other forms.

A ring-shaped diffraction grating 82a is formed on one side of a lens substrate 81, and a ring-shaped diffraction grating 82b is formed also on the other side opposite to that side. Protective films 83a and 83b are formed such that they cover these diffraction gratings 82a and 82b, respectively. In the following description, either or both of the diffraction gratings 82a and 82b may be referred to as "diffraction grating 82". Similarly, either or both of the protective films 83a and 83b may be referred to as "protective film 83".

Figure 10:
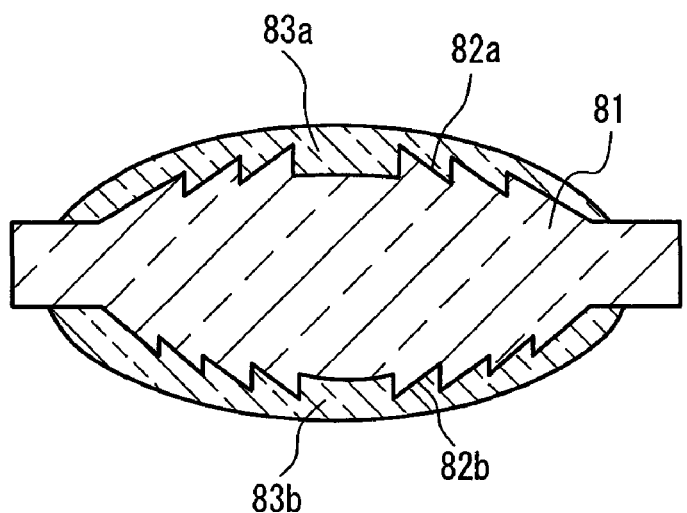
FIG. 10 is a cross-sectional view schematically showing an example of a lens according to a third embodiment of the present invention.

Although the diffraction grating 82 and the protective film 83 are formed on both sides of the lens in FIG. 10, the diffraction grating 82 may be formed on only one side of the lens substrate 81, or may be formed on both sides. If the diffraction grating 82 is formed on both sides, the diffraction gratings 82a and 82b on both sides may not necessarily have the same depth and shape. The ring pitches in the diffraction gratings 82a and 82b on both sides may not necessarily be the same. The diffraction grating 82 may not necessarily be ring-shaped, but may be in the form of a straight line or a curve, or may be a holographic diffraction grating. Further, the materials and the thicknesses of the protective films 83a and 83b on both sides may not necessarily be the same. The lens substrate 81 may not necessarily have convex surfaces on both sides, but may have a concave surface and a convex surface, concave surfaces on both sides, flat surfaces on both sides, a flat surface and a concave surface, a flat surface and a convex surface, or a flat surface and a concave surface.

In the lens according to the present invention, the above-described composite material of the present invention can be used as the material of the substrate 81 of the lens. Since the composite material according to the present invention exhibits a high refractive index and low dispersion, using the composite material as the lens substrate 81 makes it possible to realize a lens substrate 81 with a smaller thickness than can be achieved with conventional plastic lenses, and to reduce the influence of field curvature or chromatic aberration. By forming the diffraction grating pattern at least one side of the lens in particular, it is possible to obtain a lens having a smaller thickness and excellent optical characteristics.

The method for processing the lens substrate 81 using the composite material according to the present invention may differ depending on the resin serving as the substrate of the composite material. For example, the lens substrate 81 can be molded into a desired lens shape by the following methods: a method in which the composite material is softened or melted and supplied in this state into a die for forming a lens shape, followed by molding; a method in which a composition obtained by mixing inorganic particles or a raw material of the inorganic particles with a monomer, an oligomer or the like serving as a raw material of a resin is injected into a die, followed by heating and/or energy ray irradiation, thereby synthesizing the raw material of the resin. At this time, the diffraction grating 82 is formed on the surface of the resulting lens substrate 81 by forming a diffraction grating pattern in the die. It should be noted that the method for processing the lens substrate 81 is not limited to these methods.

In the case of using the composite material according to the present invention as the lens substrate 81, a light-transmitting resin commonly used for a plastic lens and the like can be used for the resin serving as the substrate of the composite material, as long as the effect of the present invention can be achieved. Examples of the resins that can be used include, but are not necessarily limited to, a methacrylic resin, a polycarbonate resin, a polystyrene and an alicyclic polyolefin resin. Among them, it is particularly preferable to use a thermoplastic resin as the substrate because of the ease of molding and processing, and the higher productivity.

The lens substrate 81 according to the present invention is made of a resin-based composite material, and therefore can be manufactured easily. The lens substrate 81 in which the diffraction grating 82 is formed readily can be mass-produced by molding using dies. In an example of processing of the dies, a plating film is formed on the surface of each die. This plating film is subjected to a turning process using a diamond tool or the like, thereby processing a lens molding piece. If polycarbonate, a cycloolefin-based resin or the like, which is a thermoplastic resin, is mixed in the composite material, then the lens substrate 81 in which the diffraction grating 82 is formed readily can be produced by injection molding.

It is also possible to use a material that allows ultraviolet light or visible light to transmit therethrough, such as quartz, and form an inverted pattern of a step-like diffraction grating pattern by dry etching or the like on the material, thereby producing a die material. The lens substrate 81 made of the composite material and in which the diffraction grating 82 is formed readily can be produced by using so-called photopolymer molding in which a composite material mixture containing a photo-curable resin such as an ultraviolet-curable resin or a visible light-curable resin is, for example, applied onto the die material, and the composite material is cured with light and released from the die.

In order to ensure ease of die processing, contribution of the diffraction grating pattern to the lens performance, and stability in the ambient temperature, it is preferable that the depth of the diffraction grating pattern is not more than 20 μm. It is difficult to process a die for forming a diffraction grating pattern having a depth exceeding several tens of micrometers with high processing accuracy. The reason is that die processing usually is performed using a bite, but, if the depth of the diffraction grating pattern is large, the amount of processing increases, and the tip of the bite is worn out, which degrades the processing accuracy. At the same time, if the depth of the diffraction grating pattern is increased, then it is not possible to narrow the pitch of the diffraction grating pattern. If the depth of the diffraction grating pattern is large, it is necessary to process the die using a tool whose tip has a large radius of curvature. As a result, the diffraction grating pattern cannot be processed without increasing the pitch of the diffraction grating pattern to some extent. For this reason, the design flexibility of the grating pattern decreases as the depth of the diffraction grating pattern increases, and the effect of reducing the aberration by the diffraction grating pattern decreases accordingly.

A protective film 83 having the effect of adjusting optical characteristics such as a refractive index and a reflectance, or mechanical characteristics such as friction resistance and thermal expansion separately may be formed on the lens substrate 81 that is formed using the composite material of the present invention.

Further, the above-described composite material of the present invention may be used as the material for the protective film 83 formed on the lens substrate 81. In the case of using the composite material of the present invention as the protective film 83 on the lens substrate 81, it is possible to reduce the influence of field curvature or chromatic aberration, as in the case of using it as the lens substrate 81.

In the case of forming the protective film 83 made of the composite material of the present invention on the diffraction grating 82 formed on at least one side of the lens substrate 81, the diffraction grating depth d', with which the first-order diffraction efficiency of the lens is 100% at a certain wavelength λ is given by Formula (9). In Formula (9), $n_{COM\,\lambda}$ represents the refractive index of the protective film 83 made of the composite material at the wavelength λ, $n_{L\,\lambda}$ represents the refractive index of the lens substrate 81 at the wavelength λ.

$$d' = \lambda/(n_{COM\,\lambda} - n_{L\,\lambda}) \quad (9)$$

If the value of the right-hand side of Formula (9) is constant in a certain wavelength region, then this means that there is no wavelength dependence of the first-order diffraction efficiency in that wavelength region. In order to realize this, the lens substrate 81 and the protective film 83 may be formed by a combination of a material exhibiting a high refractive index and low dispersion and a material exhibiting a low refractive index and high dispersion. By forming the protective film 83 using the composite material of the present invention that has been prepared by appropriately selecting the kind of the resin and the inorganic particles, and the weight ratio thereof, it is possible to form a lens that has little wavelength dependence on the first-order diffraction efficiency, without increasing the diffraction grating depth d'. Accordingly, it is possible to narrow the pitch of the diffraction grating pattern, thereby forming a lens that does not exhibit chromatic aberration in a wide wavelength region and has excellent MTF properties, without combining plural lenses. As a result, it is possible to reduce the thickness and the size of the optical devices.

In particular, by forming the protective film 83 using the composite material of the present invention having a high refractive index and low dispersion, it is possible to use resin-based materials, which are known to have a relatively low refractive index as optical materials, as the material of the lens substrate 81. Accordingly, the entire lens according to the present invention can be composed of a resin-based material, so that the productivity greatly increases and the weight can be reduced.

The resin serving as the substrate of the composite material used for the protective film 83 is selected from materials capable of realizing the refractive index distribution of the composite material such that the value of the right-hand side of Formula (9) is as constant as possible in the wavelength region in which the lens is used, taking into consideration the film-forming capability, the adhesion to the lens substrate 81 and the dispersibility of the inorganic particles, for example. Furthermore, in the case of using the lens of the present invention for an optical device that does not use a cover glass, the resin itself serving as the substrate of the protective film 83 is required to have some degree of strength (friction resistance).

The kind of the inorganic particles dispersed in the protective film 83 and the weight ratio thereof is determined such that the value of the right-hand side of Formula (9) is as constant as possible in the wavelength region in which the lens is used. Once the refractive index distribution of the lens substrate 81 has been determined, the refractive index of the protective film 83 that can satisfy Formula (9) and the dispersion (Abbe's number) thereof can be calculated. Accordingly, the kind of the resin substrate and the inorganic particles and the weight ratio thereof that show the calculated refractive index and Abbe's number may be estimated, using the Maxwell Garnett theory shown in Formulae (4), (7) and (8).

As shown in Formula (9), the diffraction grating depth d' is inversely proportional to the refractive index difference between the protective film 83 and the lens substrate 81. That is, the refractive index difference between the protective film 83 and the lens substrate 81 may be increased in order to decrease the diffraction grating depth d'. However, the diffraction grating depth d' decreases when the refractive index difference between the protective film 83 and the lens substrate 81 is excessively large. In order for the value of the right-hand side of Formula (9) to be constant in the entire wavelength region in which the lens is used, the Abbe's number of the material of the protective film 83 needs to be either a very small value of not more than 10 (including negative values), or a very large value of not less than 70. However, it is difficult to realize such a material. Therefore, it is necessary to design the composition of the protective film 83 such that the refractive index difference between the protective film 83 and the lens substrate 81 is as large as possible within the range of feasible Abbe's numbers.

As discussed above, in the case of using a resin-based material as the material of the lens substrate 81, it is preferable that the diffraction grating depth d' is not more than 20 μm, for ensuring ease of die processing, the contribution of the diffraction grating pattern to the lens performance and stability in the ambient temperature. By using, as the material of the protective film 83, the composite material according to the present invention in which the total weight ratio of the inorganic particles to the composite material as a whole is not less than 50 wt % (corresponding to not less than about 16 vol % in volume ratio) and having a high refractive index and low dispersion, the refractive index difference between the lens substrate 81 having a low refractive index and the protective film 83 is increased. As a result, it is possible to decrease the diffraction grating depth d', improving moldability of the lens substrate 81.

With regard to the thickness of the protective film 83, there will be no problem in the lens characteristics, as long as only the diffraction grating 82 formed on the lens substrate 81 is embedded in the protective film 83 without flaws. In this case, the protective film 83 has a thickness equal to the diffraction grating depth d' at its thickest portion, and has a thickness of 0 at its thinnest portion. In practice, from the viewpoint of providing a tolerance for the conditions of the formation process, the thickness of the thickest portion of the protective film 83 usually is larger than the diffraction grating depth d'. However, when the thickness of the protective film 83 increases, the coma aberration or the like of the lens increases, and the contraction of the protective film 83 during the formation will have an increased influence, which makes it difficult to control the surface shape of the protective film 83, and causes deterioration of the lens characteristics. Further, in the case of forming the protective film 83 from the composite material of the present invention, the light transmission decreases as the film thickness increases. From the above-described viewpoints, the thickness of the thickest portion of the protective film 83 preferably is not less than the diffraction grating depth d' and not more than 200 µm, and particularly preferably is not less than the diffraction grating depth d' and not more than 100 µm.

By using the composite material of the present invention in which the total weight ratio of the inorganic particles to the composite material as a whole is not less than 50 wt % (corresponding to not less than about 16 vol % in volume ratio) as the material of the protective film 83 in particular, it is possible to increase the refractive index difference between the lens substrate 81 and the protective film 83, thus decreasing the diffraction grating depth d'. Accordingly, it is also possible to decrease the minimum value of the thickness of the protective film 83. As a result, the problem of reduced light transmission, which often occurs in a composite material containing a large amount of inorganic particles, can be avoided in the lens according to the present invention, and therefore, it is possible to realize a lens having excellent transparency. Further, since the protective film 83 has a small thickness, the influence of contraction of the protective film 83 during the formation is suppressed, and as a result, it is possible to avoid deterioration of the lens performance due to surface deformation of the protective film 83, and a decrease in the production yield due to cracking caused by residual stress. Moreover, the loss of the obliquely incident light at the stepped portion of the diffraction grating is improved as a result of decreasing the diffraction grating depth d', so that the lens characteristics also improve.

The protective film 83 using the composite material of the present invention can be formed on the lens substrate 81, using the above-described application liquid. In this case, as the material of the lens substrate 81, it is necessary to select, from among light-transmitting materials commonly used for the lens substrate, a material that has the refractive index characteristic capable of reducing the wavelength dependence of the first-order diffraction efficiency in the relationship with the protective film 83, and that can keep the light transmission and the diffraction grating pattern without being affected by the solvent (dispersion medium) used for the application liquid. That is, the material of the lens substrate 81 is selected from various optical glasses, transparent ceramics, light-transmitting resins (e.g., a methacrylic resin, a polycarbonate resin, a polystyrene, and an alicyclic polyolefin resin) used for plastic lenses and the like, in accordance with requirements such as the refractive index, the dispersion and the adaptability (e.g., chemical durability relative to the composite material or solvent contained in the application liquid, heat resistance, light resistance and durability to pressure) to the formation process of the protective film. In the case of using a resin as the lens substrate 81, inorganic particles for adjusting optical characteristics such as a refractive index or mechanical characteristics such as thermal expansion, and a dye, a pigment or the like that absorbs the electromagnetic waves in a specific wavelength region may be contained in the resin, as necessary. Furthermore, the composite material according to the present invention also can be used as the lens substrate 81.

As the process for forming the protective film 83 on the lens substrate 81, the following are applicable: various molding methods using dies; application using an injection nozzle of a dispenser or the like; a jetting application such as the ink jet method; application by rotation, such as spin coating; application by squeezing, such as screen printing and pad printing; and transferring. Alternatively, these processes may be combined appropriately.

An antireflection film additionally may be formed on the surface of the protective film 83. There is no particular limitation with respect to the material of the antireflection film, as long as it has a lower refractive index than that of the composite material used for the protective film 83. Examples thereof include a resin, a resin composition made of a resin and inorganic particles, and an inorganic thin film formed by vacuum deposition or the like. As the inorganic particles contained in the resin composition used for the antireflection film, it is possible to use, for example, silica, alumina and magnesium oxide, which have a low refractive index. Using the resin composition as the material of the antireflection film facilitates the production of the antireflection film, and reduces the thermal expansion coefficient difference between the lens substrate 81 and/or protective film 83 made of the composite material according to the present invention and the antireflection film. Accordingly, the stability of the characteristics against the change in the ambient temperature improves, and cracking or the detachment of the film tends not to occur. It is also possible to form an antireflection pattern having a nano structure on the surface of the protective film 83. This antireflection pattern readily can be formed, for example, by a transfer process (nano-printing) using a die. A protective layer having the effect of adjusting mechanical characteristics such as friction resistance and thermal expansion additionally may be formed on the surface of the protective film 83.

Fourth Embodiment

Figure 11:
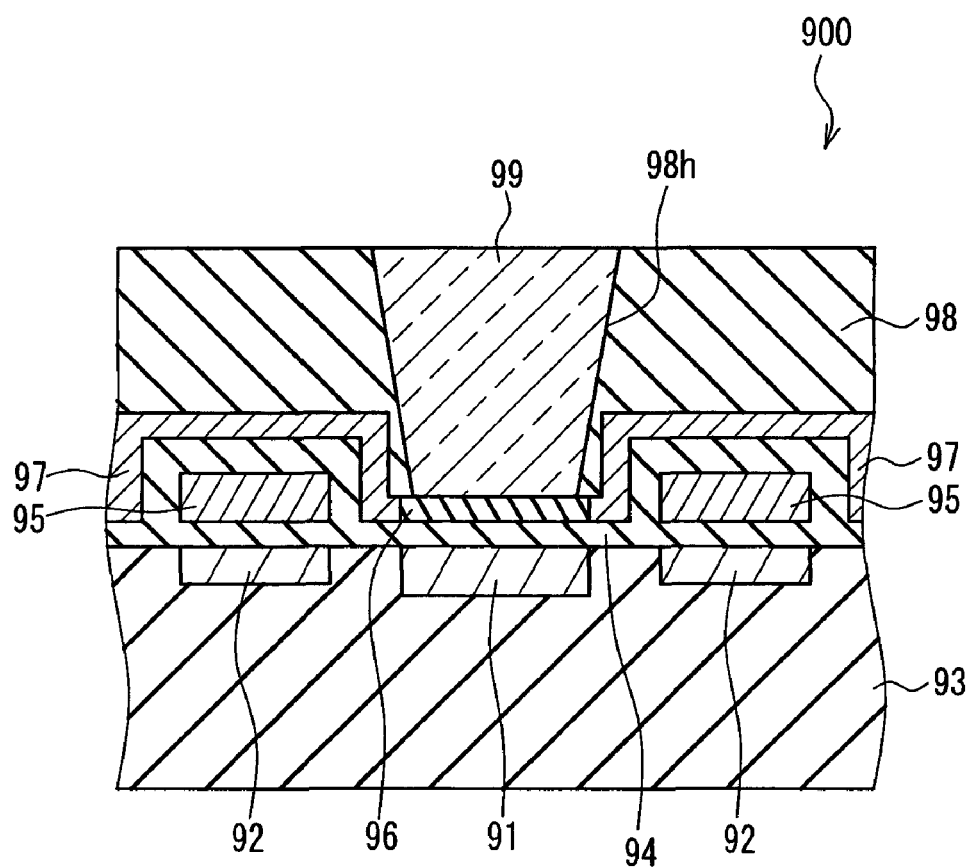
FIG. 11 is a cross-sectional view schematically showing an example of a solid-state image sensor in which an optical waveguide is formed, according to a fourth embodiment of the present invention.

Another embodiment of an optical component using the composite material of the present invention will be described with reference to FIG. 11. FIG. 11 is a cross-sectional view showing an example of a CCD solid-state image sensor in which an optical waveguide is formed using the composite material of the present invention. Although this embodiment will be described using a CCD solid-state image sensor, the composite material of the present invention is applicable to other types of solid-state image sensors such as MOS elements.

FIG. 11 only shows a portion of the CCD that corresponds to a single pixel. A CCD 900 includes a substrate 93 including a photoelectric conversion portion (light-receiving sensor) 91 and a charge transfer portion 92 that are formed on its surface, and an insulating layer 94, a transfer electrode 95, an antireflection film 96, a light-shielding film 97, an interlayer dielectric film 98 and an optical waveguide 99 that are formed on the substrate 93.

The substrate 93 is a semiconductor substrate such as silicon. A plurality of photoelectric conversion portions 91 for performing photoelectric conversion are formed on the surface of the substrate 93. Two charge transfer portions 92 are disposed such that they sandwich each photoelectric conversion portion 91. The photoelectric conversion portion 91 and the charge transfer portion 92 can be formed, for example, by doping a semiconductor substrate of a specific conductivity type with an impurity.

The insulating layer 94 is made of silicon oxide ($SiO_2$), and can be formed by a thermal oxidation method, a CVD method or the like. The transfer electrode 95 is disposed facing the charge transfer portion 92, with the insulating layer 94 sandwiched between the charge transfer portion 92 and the transfer electrode 95. The transfer electrode 95 is made of polysilicon, for example. Signal charges obtained by photoelectric conversion in the photoelectric conversion portion 91 are read into the charge transfer portion 92, and transferred by the transfer electrode 95.

The antireflection film 96 prevents light entering from the optical waveguide 99 from being reflected, and is disposed above the photoelectric conversion portion 91. The antireflection film 96 also serves as an etching stopper layer. The antireflection film 96 can be formed from aluminum oxide or silicon nitride, for example.

The light-shielding film 97 is formed on the surface of the insulating layer 94, except for the portion above the photoelectric conversion portion 91. The light-shielding film 97 is formed such that it covers the transfer electrode 95. The light-shielding film 97 may be made of metal such as aluminum (Al) or tungsten (W), for example.

The interlayer dielectric film 98 is formed above the substrate 93, or more specifically, above the light-shielding film 97. The interlayer dielectric film 98 serves as a planarizing film. The interlayer dielectric film 98 may be formed from $SiO_2$, for example. A hole 98*h* passing through the interlayer dielectric film 98 is formed in the interlayer dielectric film 98 at the portion above the photoelectric conversion portion 91.

The optical waveguide 99 made of the composite material according to the present invention is formed in the hole 98*h*. The refractive index of the composite material (optical waveguide 99) is larger than that of the interlayer dielectric film 98. A pretreatment for enhancing the adhesion between the interlayer dielectric film 98 and the composite material may be performed on the surface of the inner wall of the hole 98*h*. As the pretreatment, it is possible to use, for example, a surface treatment using a coupling agent or the like, or a plasma treatment.

The cross-sectional shape of the optical waveguide 99 (the shape of the optical waveguide when viewed from the above) may be circular or rectangular, for example. The size of the optical waveguide 99 (the diameter or the length of a side of the shape viewed from the above) may be about 0.5 μm to 3 μm, for example. The aspect ratio of the optical waveguide 99, that is, the ratio of the length (length in the direction perpendicular to the surface of the substrate 93) to the size of the bottom (the face on the substrate 93 side) (length/bottom size) is about 1 to 5. However, the shape of the optical waveguide 99 may vary depending on the design of the solid-state image sensor, and therefore is not limited to the above-described shapes.

The solid-state image sensor shown in FIG. 11 is merely an example, and the present invention is applicable to various other forms. For example, an on-chip lens may be formed above the optical waveguide 99. The shape of the optical waveguide 99 is not limited to a tapered shape in which the cross-sectional area gradually decreases from the top toward the bottom as shown in FIG. 11, and may be, for example, a columnar shape in which the cross-sectional area is constant, or a shape in which the interface with the interlayer dielectric film 98 is step-like. A plurality of electrodes may be formed inside the interlayer dielectric film 98.

The optical waveguide 99 may function as a wavelength filter. For example, the optical waveguide 99 may function as a color filter by further mixing a dye, a pigment or the like that absorbs light of a specific wavelength range into the composite material according to the present invention serving as the material of the optical waveguide 99. Alternatively, the optical waveguide 99 may function as an infrared-shielding filter by mixing a material that absorbs infrared light (e.g., a complex salt of a metal ion such as copper ion), a dye having an absorption band in a near-infrared wavelength region, or inorganic particles of indium tin oxide (ITO), antimony tin oxide (ATO) or the like. Similarly, the optical waveguide 99 may function as an ultraviolet-shielding filter by including a material that absorbs ultraviolet light, such as zinc oxide or cerium oxide.

As mentioned above, the optical waveguide 99 of the present invention can be formed, for example, by applying the application liquid, followed by removal of the solvent and/or curing. In the case of forming the optical waveguide 99 in a hole 98*h* having a high aspect ratio or a hole 98*h* having a complex pattern, such as a step-like pattern, formed on its inner wall, it is possible to use a method in which a mixture containing substances for forming the composite material is disposed in the hole 98*h* under reduced pressure, and the substances are packed into the hole 98*h* by increasing the pressure. Depending on the application of the optical waveguide 99, a step of planarizing the film formed of the composite material may be performed. Examples of the planarizing method include a method of increasing the number of revolutions of spin coating, grinding such as CMP (Chemical Mechanical Polishing), etching using plasma, etchant or the like, and removal of the excess composite material by squeezing.

An optical waveguide used for an optical communications device, a solid-state imaging device and the like can be formed, using the composite material of the present invention. With the development of finer devices, the aspect ratio of the hole in which the optical waveguide is formed has increased. This has resulted in the phenomena that the coverage of the materials embedded in the hole has deteriorated, and voids are created inside the optical waveguide. Such a problem is prominent particularly in optical waveguides that are formed by vacuum deposition using a silicon nitride film, a DLC film and the like. On the other hand, optical waveguides that are formed by coating a polyimide resin and the like exhibit favorable coverage, but have the problems of a small refractive index difference with the surrounding materials and low light collection efficiency.

The composite material according to the present invention has a high refractive index achieved with the inorganic particles containing zirconium oxide dispersed therein, so that it is possible to form an optical waveguide having high light collection efficiency. As a result, as shown in this embodiment, applying the optical waveguide 99 of the present invention to a solid-state imaging device makes it possible to suppress a reduction of the sensitivity when the pixels are made fine. On the other hand, applying the optical waveguide of the present invention to an optical communications device makes it possible to decrease the bend radius of the optical circuit, so that it is possible to form a complex circuit in a reduced area. The optical waveguide of the present invention uses a resin as its substrate, and therefore exhibits favorable coverage. Additionally, the optical waveguide can be formed by application, and therefore, it is possible to form an optical waveguide in a shorter period of time and with a lower energy, as compared with an optical waveguide formed by vacuum deposition. Furthermore, the composite material of the present invention has a smaller thermal expansion coefficient than in the case of using only a resin, so that it is possible to inhibit detachment of the optical waveguide due to temperature change.

EXAMPLES

Hereinafter, specific examples of the composite material according to the present invention, and the optical component that has been formed using the same will be described.

Example 1

A composite material in which zirconium oxide particles were dispersed was prepared in the following manner. First, a 30 wt % methyl ethyl ketone dispersion of zirconium oxide (primary particle diameter: 15 nm, effective particle diameter measured by the light-scattering method: 30 nm) was added to a 30 wt % methyl isobutyl ketone solution of an epoxy-based oligomer (manufactured by Asahi Denka Co., Ltd., Optomer KRX, d-line refractive index: 1.62, Abbe's number: 24, density after curing: 1.2) such that zirconium oxide was 68 wt % (corresponding to 30 vol %) in the solid matter, and the mixture was stirred with a rotation/revolution mixer to obtain a homogeneous application liquid of the composite material. This application liquid was applied by spin coating onto a silicon substrate to a thickness of 500 nm, and the oligomer was converted into an epoxy resin (shown as "Resin A" in Table 3) by ultraviolet light irradiation, thereby forming a coating film made of the composite material on the substrate.

Example 2

A composite material in which zirconium oxide particles and silica particles were dispersed was prepared in the following manner. First, a 30 wt % methyl ethyl ketone dispersion of zirconium oxide shown in Example 1 and a 25 wt % propylene glycol monomethyl ether dispersion of silica (primary particle diameter: 16 nm, effective particle diameter measured by the light scattering method: 30 nm) were added to a 25 wt % propylene glycol monomethyl ether solution of the epoxy-based oligomer shown in Example 1 such that zirconium oxide was 57 wt % (corresponding to 22.5 vol %) and silica was 7 wt % (corresponding to 7.5 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 1.

Example 3

A composite material in which zirconium oxide particles and alumina particles were dispersed was prepared in the following manner. First, a 30 wt % methyl ethyl ketone dispersion of zirconium oxide shown in Example 1 and a 15 wt % methyl isobutyl ketone dispersion of alumina (primary particle diameter: 30 nm, effective particle diameter measured by the light scattering method: 50 nm) were added to a 15 wt % methyl isobutyl ketone solution of the epoxy-based oligomer shown in Example 1 such that zirconium oxide was 49 wt % (corresponding to 20 vol %) and alumina was 16 wt % (corresponding to 10 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 1.

Comparative Example 1

A composite material in which alumina particles were dispersed was prepared in the following manner. First, a 15 wt % methyl isobutyl ketone dispersion of alumina shown in Example 3 was added to a 15 wt % methyl isobutyl ketone solution of the epoxy-based oligomer shown in Example 1 such that alumina was 58 wt % (corresponding to 30 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 1.

Comparative Example 2

A composite material in which titanium oxide particles were dispersed was prepared in the following manner. First, a 30 wt % propylene glycol monomethyl ether dispersion of titanium oxide (primary particle diameter: 15 nm, effective particle diameter measured by the light scattering method: 50 nm) was added to a 30 wt % propylene glycol monomethyl ether solution of the epoxy-based oligomer shown in Example 1 such that titanium oxide was 60 wt % (corresponding to 30 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 1.

The refractive indices of the coating films obtained in Examples 1 to 3 and Comparative Examples 1 to 2 were measured by an ellipsometer (a spectroscopic ellipsometer manufactured by J. A. Woollam Co., Inc.). The results are shown in Table 3.

TABLE 3

| | Resin | Inorganic particles 1 | | Inorganic particles 2 | | d-line refractive index | Abbe's number |
|---|---|---|---|---|---|---|---|
| | | Kind | Volume ratio (vol %) | Kind | Volume ratio (vol %) | | |
| Example 1 | Resin A | $ZrO_2$ | 30 | — | — | 1.70 | 26 |
| Example 2 | Resin A | $ZrO_2$ | 22.5 | $SiO_2$ | 7.5 | 1.68 | 28 |
| Example 3 | Resin A | $ZrO_2$ | 20 | $Al_2O_3$ | 10 | 1.69 | 29 |
| Com Ex. 1 | Resin A | $Al_2O_3$ | 30 | — | — | 1.63 | 32 |
| Com Ex. 2 | Resin A | $TiO_2$ | 30 | — | — | 1.81 | 16 |

The d-line refractive index of the composite material of Comparative Example 1, in which alumina was dispersed, is 1.63. Therefore, alumina does not have a great effect of improving the refractive index, and Formula (2) cannot be satisfied by using alumina as the first inorganic particles. The composite material of Comparative Example 2, in which titanium oxide was dispersed, has an improved d-line refractive index of 1.81, but has an Abbe's number of 16, which is significantly lower than the Abbe's number of Resin A.

On the other hand, the composite materials of Examples 1 to 3, which contained zirconium oxide, have a d-line refractive index of 1.68 to 1.70 and an Abbe's number of 26 to 29. Therefore, each of these composite materials satisfies Formula (2) and exhibits a high refractive index and low dispersion.

As a result of observing the composite materials of Examples 1 to 3, which contained zirconium oxide, with a scanning electron microscope, the effective particle diameter of the zirconium oxide particles in each of the composite materials was about 30 nm. Further, the light transmittance at a wavelength of 400 to 700 nm of each of the composite materials was higher than 90%, which was favorable.

Example 4

A composite material in which zirconium oxide particles were dispersed was prepared in the following manner. First, a 30 wt % methyl ethyl ketone dispersion of zirconium oxide shown in Example 1 was added to a 30 wt % methyl isobutyl ketone solution of an acrylic-based oligomer (manufactured by NIPPON GOHSEI, UV-7000B, d-line refractive index: 1.51, Abbe's number: 51, density after curing: 1.2) such that zirconium oxide was 68 wt % (corresponding to 30 vol %) in the solid matter, and the mixture was stirred with a rotation/revolution mixer to obtain a homogeneous application liquid of the composite material. This application liquid was applied by spin coating onto a silicon substrate to a thickness of 500 nm, and the oligomer was converted into an acrylic resin (shown as "Resin B" in Table 4) by ultraviolet light irradiation, thereby forming a coating film made of the composite material on the substrate.

Example 5

A composite material in which zirconium oxide particles and silica particles were dispersed was prepared in the following manner. First, a 30 wt % methyl ethyl ketone dispersion of the zirconium oxide shown in Example 1 and a 25 wt % propylene glycol monomethyl ether dispersion of silica shown in Example 2 were added to a 25 wt % propylene glycol monomethyl ether solution of the acrylic-based oligomer shown in Example 4 such that zirconium oxide was 57 wt % (corresponding to 22.5 vol %) and silica was 7 wt % (corresponding to 7.5 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 4.

Example 6

A composite material in which zirconium oxide particles and alumina particles were dispersed was prepared in the following manner. First, a 30 wt % methyl ethyl ketone dispersion of zirconium oxide shown in Example 1 and a 15 wt % methyl isobutyl ketone dispersion of alumina shown in Example 3 were added to a 15 wt % methyl isobutyl ketone solution of the acrylic-based oligomer shown in Example 4 such that zirconium oxide was 49 wt % (corresponding to 20 vol %) and alumina was 16 wt % (corresponding to 10 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 4.

Comparative Example 3

A composite material in which alumina particles were dispersed was prepared in the following manner. First, a 15 wt % methyl isobutyl ketone dispersion of alumina shown in Example 3 was added to a 15 wt % methyl isobutyl ketone solution of the acrylic-based oligomer shown in Example 4 such that alumina was 58 wt % (corresponding to 30 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 4.

Comparative Example 4

A composite material in which titanium oxide particles were dispersed was prepared in the following manner. First, a 30 wt % propylene glycol monomethyl ether dispersion of titanium oxide shown in Comparative Example 2 was added to a 30 wt % propylene glycol monomethyl ether solution of the acrylic-based oligomer shown in Example 4 such that titanium oxide was 60 wt % (corresponding to 30 vol %) in the solid matter, and the mixture was stirred with a rotation/revolution mixer to obtain a homogenous application liquid of the composite material. Using this application liquid, a coating film made of the composite material was formed on a silicon substrate in the same manner as in Example 4.

The refractive indices of the coating films obtained in Examples 4 to 6 and Comparative Examples 3 to 4 were measured by an ellipsometer (a spectroscopic ellipsometer manufactured by J. A. Woollam Co., Inc.). The results are shown in Table 4.

TABLE 4

| | Resin | Inorganic particles 1 | | Inorganic particles 2 | | d-line refractive index | Abbe's number |
| | | Kind | Volume ratio (vol %) | Kind | Volume ratio (vol %) | | |
|---|---|---|---|---|---|---|---|
| Example 4 | Resin B | $ZrO_2$ | 30 | — | — | 1.67 | 43 |
| Example 5 | Resin B | $ZrO_2$ | 22.5 | $SiO_2$ | 7.5 | 1.62 | 46 |
| Example 6 | Resin B | $ZrO_2$ | 20 | $Al_2O_3$ | 10 | 1.64 | 48 |

TABLE 4-continued

|  | Resin | Inorganic particles 1 Kind | Inorganic particles 1 Volume ratio (vol %) | Inorganic particles 2 Kind | Inorganic particles 2 Volume ratio (vol %) | d-line refractive index | Abbe's number |
|---|---|---|---|---|---|---|---|
| Com Ex. 3 | Resin B | $Al_2O_3$ | 30 | — | — | 1.56 | 53 |
| Com Ex. 4 | Resin B | $TiO_2$ | 30 | — | — | 1.72 | 19 |

The composite material of Comparative Example 3, in which alumina was dispersed, satisfies Formula (2), but has a low d-line refractive index of 1.56. Therefore, alumina does not have a sufficient effect of improving the refractive index. The composite material of Comparative Example 4, in which titanium oxide was dispersed, has an improved d-line refractive index of 1.72, but has an Abbe's number of 19, which is significantly lower than the Abbe's number of Resin B.

On the other hand, the composite materials of Examples 4 to 6, which contained zirconium oxide, have a d-line refractive index of 1.62 to 1.67 and an Abbe's number of 43 to 48. Therefore, each of these composite materials satisfies Formula (2) and exhibits a high refractive index and low dispersion.

As a result of observing the composite materials of Examples 4 to 6, which contained zirconium oxide, with a scanning electron microscope, the effective particle diameter of the zirconium oxide particles in each of the composite materials was about 30 nm. Further, the light transmittance at a wavelength of 400 to 700 nm of each of the composite materials was higher than 90%, which was favorable.

Example 7

A lens using the composite material of the present invention was produced in the following manner. First, a composite material was prepared as follows. A propylene glycol monomethyl ether dispersion of zirconium oxide (primary particle diameter: 3 to 10 nm, effective particle diameter measured by the light scattering method: 20 nm, containing 30 wt % of a silane-based surface treating agent) was dispersed in an alicyclic hydrocarbon group-containing acrylic-based oligomer (d-line refractive index: 1.53, Abbe's number: 52, density after curing: 1.1) such that zirconium oxide was 56 wt % (corresponding to 20 vol %) in the solid matter, followed by mixing. Then, using a polycarbonate resin (d-line refractive index: 1.585, Abbe's number: 27.9), a lens substrate 81 was molded in which ring-shaped diffraction gratings 82a and 82b having a depth of 15.50 μm were formed on both sides. The above-described composite material was dropped using a dispenser such that it covered the diffraction gratings 82a and 82b, then dried, and cured with ultraviolet light, thereby forming protective films 83a and 83b having a maximum thickness of 30 μm on both sides of the lens substrate 81. The d-line refractive index of this composite material was 1.623, and the Abbe's number was 43. As a result of observation using a transmission electron microscope, the effective particle diameter of the zirconium oxide particles in the composite material was about 6 nm, and the light transmittance at a wavelength 400 to 700 nm was higher than 90%, which was favorable.

Figure 12:
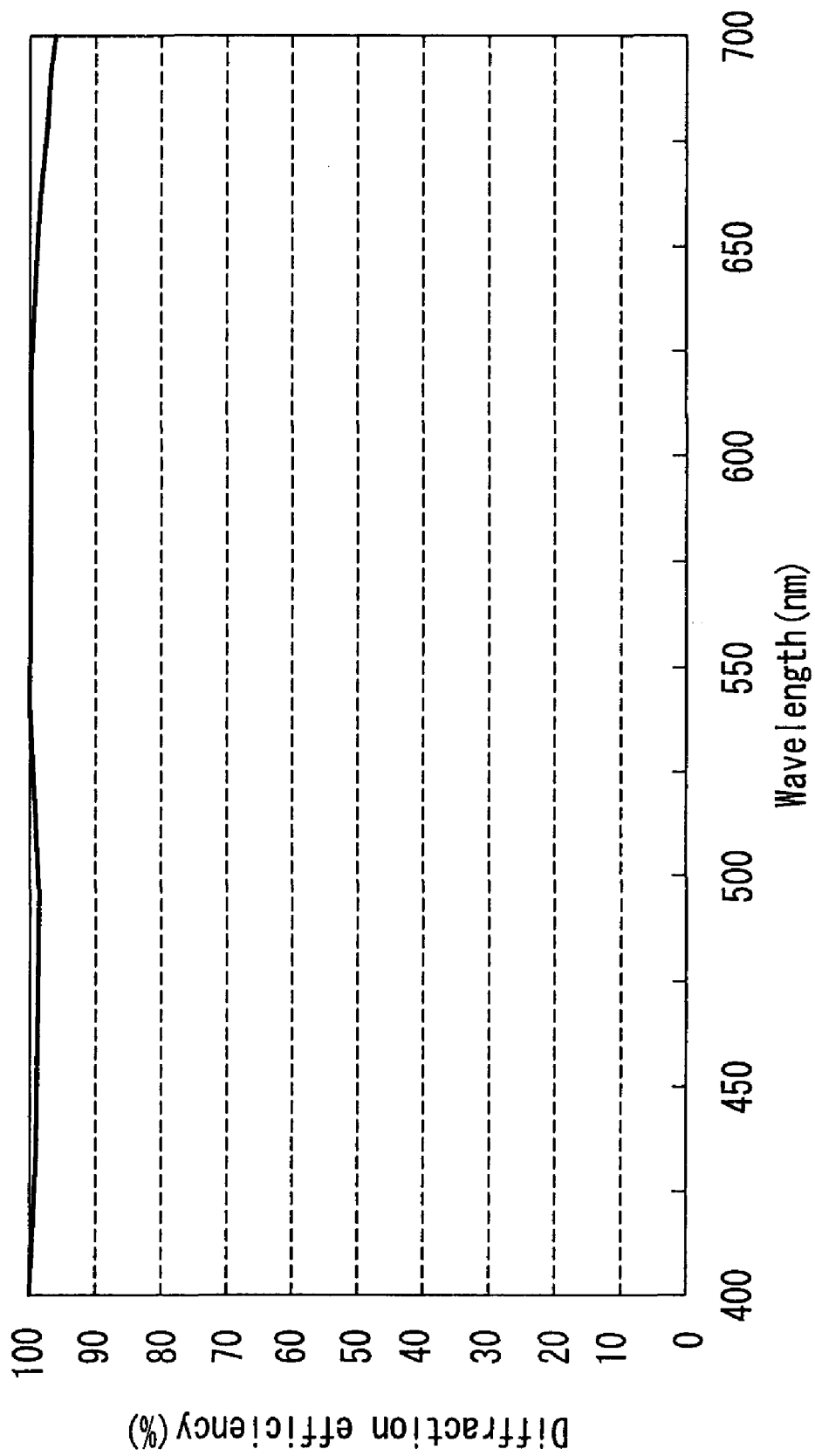
FIG. 12 is a graph showing the wavelength dependence of the first-order diffraction efficiency of a lens according to Example 7 of the present invention.

FIG. 12 shows the wavelength dependence of the first-order diffraction efficiency of this lens. The graph shows the property of one side of the lens. It can be seen that a diffraction efficiency of not less than 95% was achieved over the entire wavelength range of 400 to 700 nm, which is the visible light region.

Example 8

A lens using the composite material of the present invention was produced in the following manner. First, a composite material was prepared as follows. Zirconium oxide shown in Example 7 was dispersed in a siloxane group-containing epoxy-based oligomer (d-line refractive index: 1.50, Abbe's number: 55, density after curing: 1.18) such that zirconium oxide was 57 wt % (corresponding to 21 vol %) in the solid matter, followed by mixing. Then, using a polycarbonate resin, the same lens substrate 81 as that of Example 7 was molded in which ring-shaped diffraction gratings having a depth of 15.50 μm were formed on both sides. The above-described composite material was dropped using a dispenser such that it covered the diffraction grating patterns 82a and 82b, then dried, and cured with ultraviolet light, thereby forming protective films 83a and 83b having a maximum thickness of 30 μm on both sides of the lens substrate 81. The d-line refractive index of this composite material was 1.623, and the Abbe's number was 40. As a result of observation using a transmission electron microscope, the effective particle diameter of the zirconium oxide particles in the composite material was about 6 nm, and the light transmittance at a wavelength 400 to 700 nm was higher than 90%, which was favorable.

Figure 13:
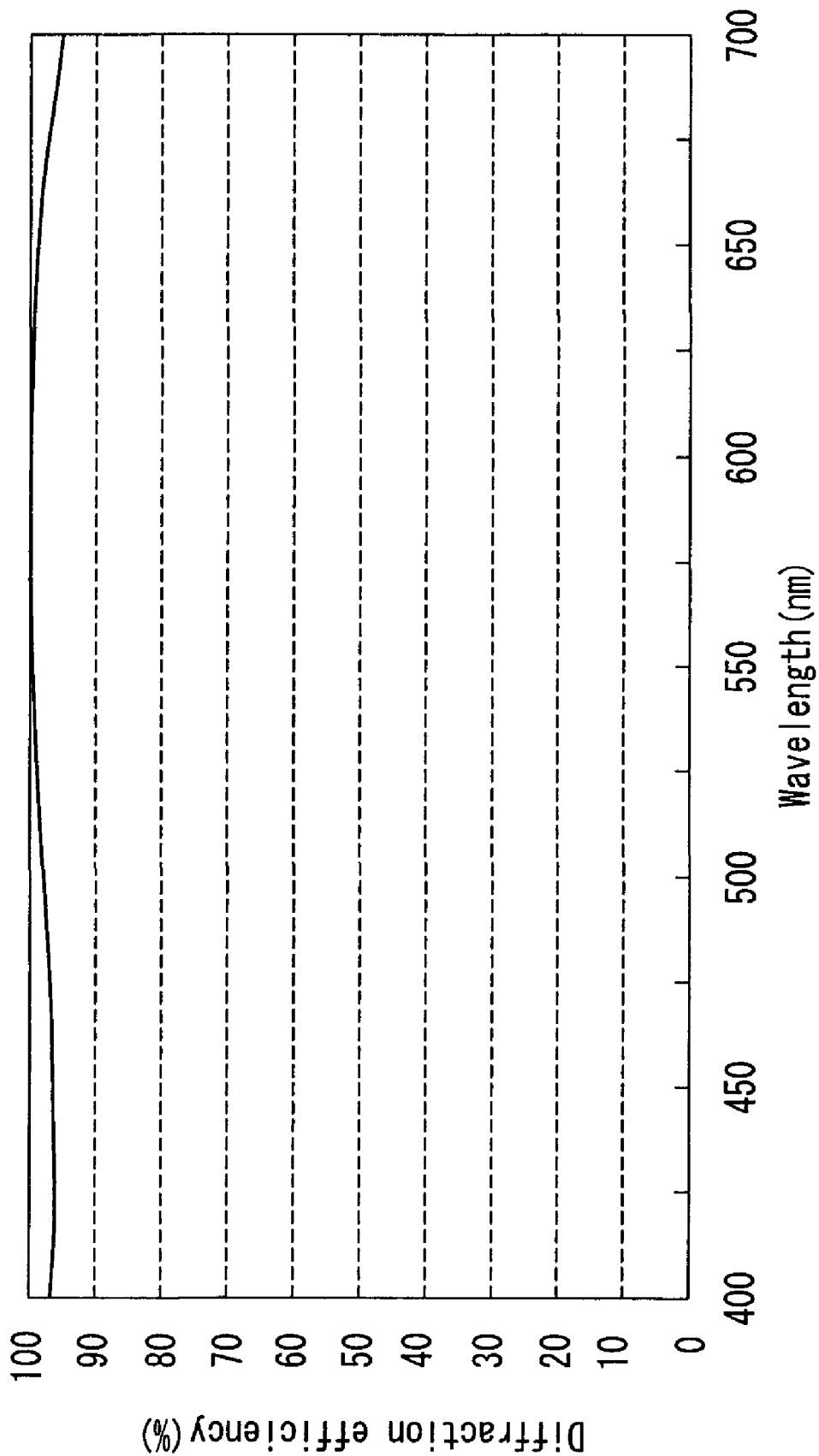
FIG. 13 is a graph showing the wavelength dependence of the first-order diffraction efficiency of a lens according to Example 8 of the present invention.

FIG. 13 shows the wavelength dependence of the first-order diffraction efficiency of this lens. The graph shows the property of one side of the lens. It can be seen that a diffraction efficiency of not less than 95% was achieved over the entire wavelength range of 400 to 700 nm, which is the visible light region.

Example 9

A lens using the composite material of the present invention was produced in the following manner. First, a composite material was prepared as follows. Zirconium oxide shown in Example 7 and alumina shown in Example 3 were dispersed in the alicyclic hydrocarbon group-containing acrylic-based oligomer shown in Example 7 such that zirconium oxide was 51 wt % (corresponding to 20 vol %) and alumina was 16 wt % (corresponding to 10 vol %) in the solid matter, followed by mixing. Then, using a polycarbonate resin (d-line refractive index: 1.585, Abbe's number: 27.9), a lens substrate 81 was molded in which ring-shaped diffraction gratings 82a and 82b having a depth of 10.70 μm were formed on both sides. The above-described composite material was dropped using a dispenser such that it covered the diffraction gratings 82a and 82b, then dried, and cured with ultraviolet light, thereby forming protective films 83a and 83b having a maximum thickness of 20 μm on both sides of the lens substrate 81. The d-line refractive index of this composite material was 1.64, and the Abbe's number was 45. As a result of observation using a transmission electron microscope, the effective particle diameter of the zirconium oxide particles in the composite material was about 6 nm and that of alumina was 50 nm, and the light transmittance at a wavelength 400 to 700 nm was higher than 85%, which was favorable.

Figure 14:
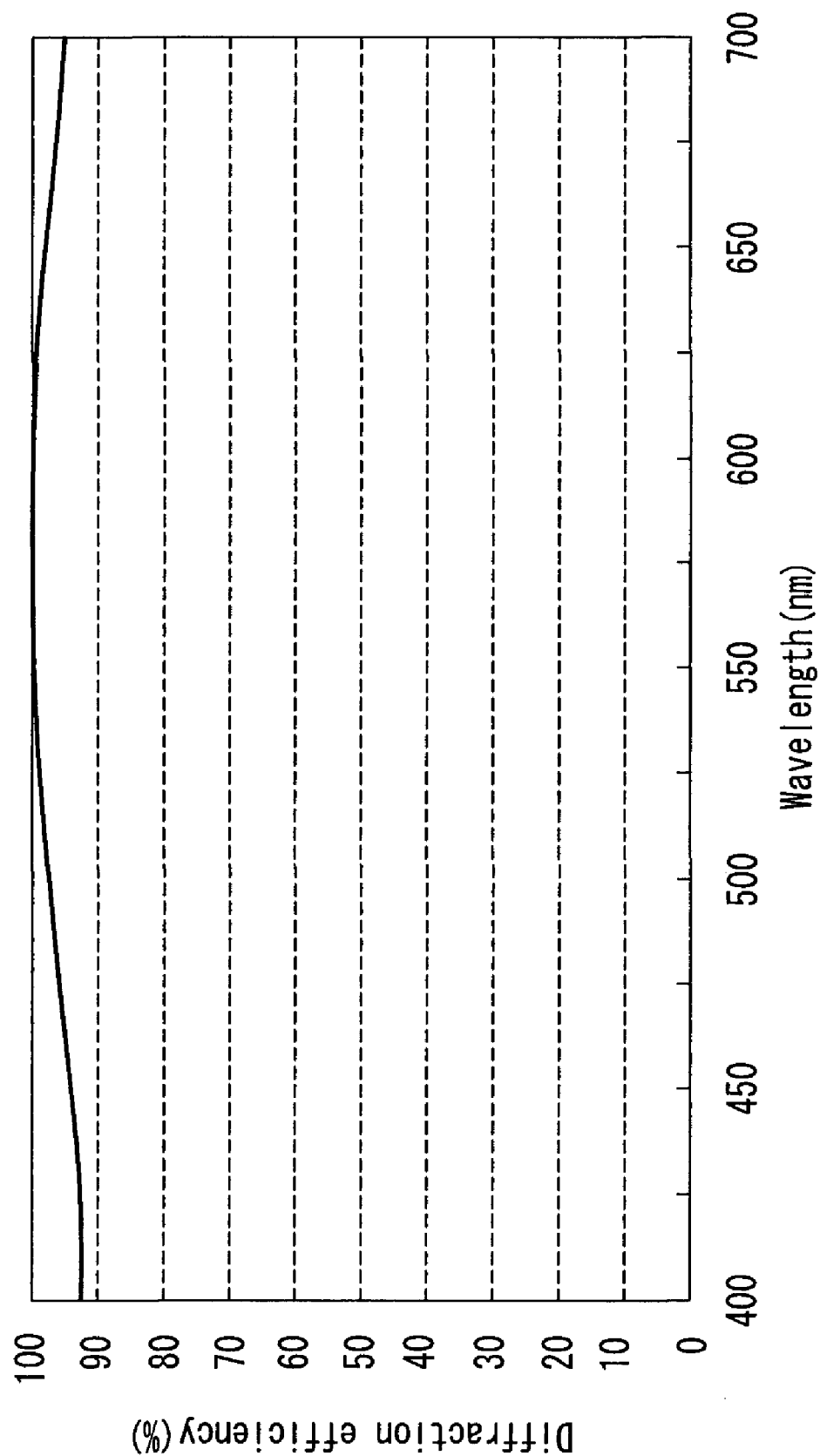
FIG. 14 is a graph showing the wavelength dependence of the first-order diffraction efficiency of a lens according to Example 9 of the present invention.

FIG. 14 shows the wavelength dependence of the first-order diffraction efficiency of this lens. The graph shows the property of one side of the lens. It can be seen that a diffraction efficiency of not less than 90% was achieved over the entire wavelength range of 400 to 700 nm, which is the visible light region.

Example 10

A lens using the composite material of the present invention was produced in the following manner. Using a material (d-line refractive index: 1.68, Abbe's number: 19) obtained by mixing 65 wt % (corresponding to 30 vol %) of zinc oxide particles (primary particle diameter: 20 nm) with a polycarbonate resin, a lens substrate 81 was molded in which ring-shaped diffraction gratings 82a and 82b having a depth of 5.20 μm were formed on both sides. A composite material obtained by dispersing 85 wt % (corresponding to 50 vol %) of zirconium oxide in a cycloolefin-based resin, followed by mixing, was applied by spin coating such that it covered the diffraction gratings 82a and 82b, and cured naturally, thereby forming protective films 83a and 83b on both sides of the lens substrate 81. The d-line refractive index of this composite material was 1.80, and the Abbe's number was 42.

Figure 15:
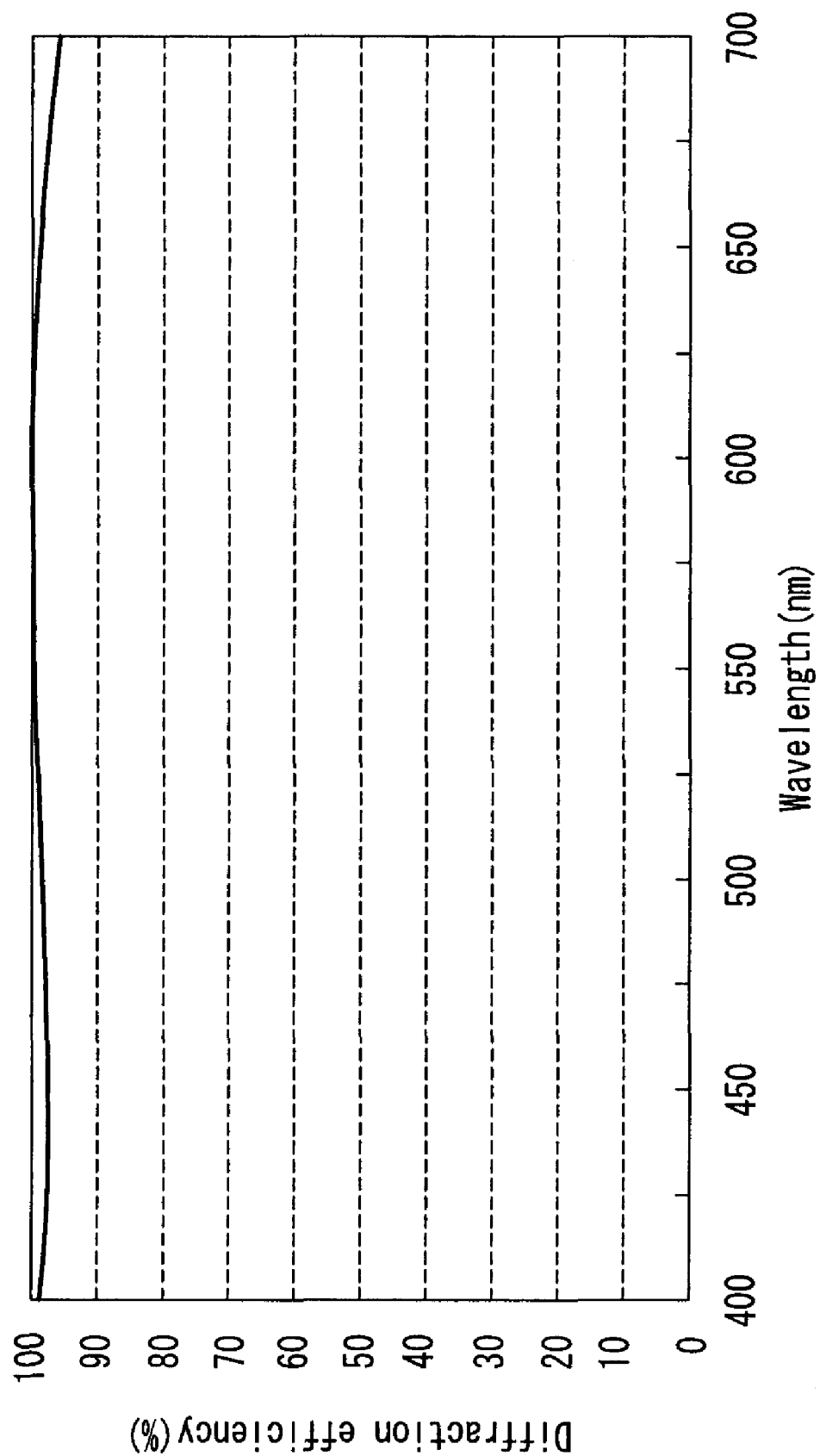
FIG. 15 is a graph showing the wavelength dependence of the first-order diffraction efficiency of a lens according to Example 10 of the present invention.

FIG. 15 shows the wavelength dependence of the first-order diffraction efficiency of this lens. The graph shows the property of one side of the lens. It can be seen that a diffraction efficiency of not less than 95% was achieved over the entire wavelength range of 400 to 700 nm, which is the visible light region.

In Example 10 above, the material of the lens substrate 81 and that of the protective films 83a and 83b were switched. That is, using a composite material obtained by dispersing 85 wt % of zirconium oxide in a cycloolefin-based resin, followed by mixing, a lens substrate 81 was molded in which ring-shaped diffraction gratings 82a and 82b having a depth of 5.20 μm were formed on both sides. Using a material obtained by mixing 65 wt % of zinc oxide with a polycarbonate resin, protective films 83a and 83b were formed on both side of the lens substrate 81 such that they covered the diffraction gratings 82a and 82b. The obtained lens also achieved the same property as that shown in FIG. 15.

Example 11

A lens using the composite material of the present invention was produced in the following manner. Using an optical glass SF14 (d-line refractive index: 1.76, Abbe's number: 27), a lens substrate 81 was molded in which ring-shaped diffraction gratings 82a and 82b having a depth of 18.9 μm were formed on both sides. A composite material obtained by dispersing 85 wt % (corresponding to 50 vol %) of zirconium oxide in a cycloolefin-based resin, followed by mixing, was applied by spin coating such that it covered the diffraction gratings 82a and 82b, and cured naturally, thereby forming protective films 83a and 83b on both sides of the lens substrate 81. The d-line refractive index of this composite material was 1.80, and the Abbe's number was 42.

As a result of evaluating the first-order diffraction efficiency of the lens of Example 11, it was seen that a diffraction efficiency of not less than 85% was achieved over the entire wavelength range of 400 to 700 nm, which is the visible light region.

Example 12

A CCD solid-state image sensor 900 including an optical waveguide formed using the composite material of the present invention was produced in the following manner.

First, a photodiode (photoelectric conversion portion) 91 was formed on a p-type silicon substrate 93 by ion plantation of phosphorus (n-type impurity). Then, a silicon oxide film (insulating film) 94 having a thickness of 20 nm was formed on this substrate by thermal oxidation. An aluminum oxide film (thickness: 60 nm) was formed on the insulating film 94 by a thermal CVD process. The aluminum oxide film was formed at 450° C. in an atmosphere of $Ar/O_2$ mixture, using aluminum acetylacetonate as the starting material. There after, an antireflection film 96 made of aluminum oxide was formed above the photoelectric conversion portion 91 by forming a resist pattern and performing etching for the aluminum oxide film.

Next, a polysilicon film having a thickness of 300 nm was deposited by a low pressure CVD process. A charge transfer electrode 95 was formed by selectively etching a part of this polysilicon film by dry etching. Further, a silicon oxide film was formed on the charge transfer electrode 95 by thermal oxidation, and the periphery of the charge transfer electrode 95 was covered with the insulating film 94.

Next, a tungsten film serving as a light-shielding film was formed on the entire surface. A light-shielding film 97 covering the periphery of the charge transfer electrode 95 was formed by forming a resist pattern on this tungsten film, followed by anisotropic dry etching.

Next, an interlayer dielectric film 98 also serving as a planarization film was formed by a CVD process. The interlayer dielectric film 98 was formed using silicon oxide having a refractive index of 1.45. Thereafter, a resist pattern was formed on the interlayer dielectric film 98, followed by anisotropic dry etching using $CF_4$, thereby forming a hole 98h (width: 1 μm×depth: 2 μm) above the photoelectric conversion portion. At this time, the antireflection film 96, which was an aluminum oxide layer, functioned as an etching stopper layer. Thus, a substrate in which an optical waveguide had not been formed was produced. Hereinafter, this substrate is referred to as "substrate A".

Next, an optical waveguide 99 made of a composite material was formed in the hole 98h of the interlayer dielectric film 98 of the substrate A. An acrylic resin (density: 1.2) having a d-line refractive index of 1.50 and an Abbe's number of 51 was used as the resin constituting the composite material, and zirconium oxide (primary particle diameter: 15 nm, effective particle diameter measured by the light scattering method: 30 nm) and alumina (primary particle diameter: 30 nm, effective particle diameter measured by the light scattering method: 50 nm) were used for inorganic particles. The ratio of the zirconium oxide particles to the composite material as a whole was 77 wt % (corresponding to 45 vol %), and the ratio of alumina to the composite material as a whole was 6 wt % (corresponding to 5 vol %). The d-line refractive index of the composite material was 1.76, and the Abbe's number was 41.

In the following, the method for forming the optical waveguide 99 will be described. First, the substrate A was fixed with a pressure of 10 Pa to a fixing stage in a reduced pressure vessel, and the pressure inside the vessel was set to 100 Pa. Then, an application liquid was applied over the substrate A, using a vacuum injection nozzle, and the substrate A was rotated at 100 rpm for 10 seconds to perform spin coating. The application liquid was prepared by mixing predetermined amounts of a methyl isobutyl ketone dispersion of zirconium oxide particles and a methyl isobutyl ketone dispersion of alumina particles with a methyl isobutyl ketone solution of an acrylic-based oligomer (UV-7000B manufactured by NIPPON GOHSEI), and stirring the mixture with a rotation/revolution mixer.

After application of the application liquid, the application liquid was embedded fully into the hole 98h by removing the reduced pressure in the vessel. Thereafter, the substrate A was rotated at 2000 rpm for 20 seconds, and planarized. Finally, the acrylic-based oligomer was converted into an acrylic resin by ultraviolet light irradiation. Thus, an optical waveguide 99 made of the composite material was formed, and an imaging element 900 of Example 12 was obtained.

Meanwhile, as Comparative Example 5, an solid-state image sensor was formed in the same manner as in Example 12, except that the hole 98h and the optical waveguide 99 were not formed in the interlayer dielectric film 98.

The sensitivity property of the thus obtained imaging elements of Example 12 and Comparative Example 5 were evaluated. As a result, the imaging element of Example 12 had achieved an image brightness about 1.8 times that achieved by the imaging element of Comparative Example 5 over the entire element, and exhibited high sensitivity. The reason is that the imaging element of Example 12 had high light collection efficiency.

Further, the relationship between the incident angle (angle with respect to the normal of the light-receiving area of the imaging element) of incident light, and the incident efficiency of incident light onto the photoelectric conversion portion 91 was measured for the imaging elements of Example 12 and Comparative Example 5. In the case of the imaging element of Example 12, when the efficiency of light that was incident vertically (incident angle: 0°) was taken as 100, the efficiency of the incident light having an incident angle of 20° was about 70, and that of the incident light having an incident angle of 30° was about 50. On the other hand, in the case of the imaging element of Comparative Example 5, when the efficiency of light that was incident vertically (incident angle: 0°) was taken as 100, the efficiency of the incident light having an incident angle of 20° was about 40, and that of the incident light having an incident angle of 30° was about 20. The light collection efficiency of the element of Comparative Example 5 decreased significantly when the incident angle was large. Thus, it was confirmed that the detection efficiency for obliquely incident light was greatly improved by forming the optical waveguide 99 using the composite material of the present invention.

Each of the above-described embodiments is intended merely to clarify the technical content of the present invention. The present invention is not to be construed as limited to these specific examples, but to be construed in a broad sense, and may be practiced with various modifications within the spirit and the scope of the claims.

INDUSTRIAL APPLICABILITY

The composite material of the present invention has well-balanced refractive index and dispersion, and therefore can be used for small optical components exhibiting favorable wavelength characteristics, For example, the composite material of the present invention is applicable to a lens, a diffractive optical element (e.g., a lens, a spatial low-pass filter, a polarizing hologram or the like in which a diffraction grating is formed), a solid-state image sensor including an optical waveguide, optical fiber, an optical disk substrate, an optical filter and an optical adhesive, as well as optical devices and systems to which these components are applied.

The invention claimed is:

1. A diffractive optical element comprising:
a substrate made of a first material and having a diffraction grating pattern formed on its surface; and
a protective film made of a second material and covering the diffraction grating pattern,
wherein the first material comprises a first resin;
the second material is a composite material that comprises a second resin and first inorganic particles dispersed in the second resin and containing at least zirconium oxide, has a refractive index at the d line $n_{COMd}$ of not less than 1.60 and an Abbe's number $v_{COM}$ of not less than 20, and satisfies $$a\ relationship\ n_{COMd} \geq 1.8 - 0.005\ v_{COM} \qquad (2);$$

the weight ratio of the first inorganic particles to the composite material as a whole is not less than 50 wt % and not more than 85 wt %;
the diffraction grating pattern has a depth of not more than 20 µm; and
the diffractive optical element has a first-order diffraction efficiency of not less than 85% at a wavelength of 400 to 700 nm.

2. The diffractive optical element according to claim 1, wherein, in a two-dimensional coordinate system in which the vertical axis represents the refractive index at the d line and the horizontal axis represents the Abbe's number, when $n_m$ represents the refractive index at the d line of the second resin, and $v_m$ represents the Abbe's number of the second resin, the point ($n_m$, $v_m$) is located in a region enclosed by (1.4, 75), (1.55, 60), (1.6, 35) and (1.45, 35), and the point ($n_{COMd}$, $v_{COM}$) is located in a region enclosed by (1.6, 40), (1.6, 53), (1.81, 43), (1.84, 35) and (1.625, 35).

3. The diffractive optical element according to claim 2, wherein the second resin is an energy ray-curable resin comprising at least one selected from the group consisting of a methacrylic group, an acrylic group and an epoxy group.

4. The diffractive optical element according to claim 2, wherein the second resin comprises at least one selected from the group consisting of an alicyclic hydrocarbon group, a siloxane structure and a fluorine atom.

5. The diffractive optical element according to claim 1, wherein the first inorganic particles have an effective particle diameter in the range of not less than 1 nm and not more than 100 nm.

6. A diffractive optical element comprising:
a substrate made of a first material and having a diffraction grating pattern formed on its surface; and
a protective film made of a second material and covering the diffraction grating pattern,
wherein the first material comprises a first resin;
the second material is a composite material that comprises a second resin, first inorganic particles dispersed in the second resin and containing at least zirconium oxide and second inorganic particles dispersed in the second resin and having an Abbe's number $v_p$ of not less than 50, has a refractive index at the d line $n_{COMd}$ of not less than 1.60 and an Abbe's number $v_{COM}$ of not less than 20, and satisfies $$a\ relationship\ n_{COMd} \geq 1.8 - 0.005\ v_{COM} \qquad (2);$$

the total weight ratio of the first inorganic particles and the second inorganic particles to the composite material as a whole is not less than 50 wt % and not more than 85 wt %;

the diffraction grating pattern has a depth of not more than 20 μm; and the diffractive optical element has a first-order diffraction efficiency of not less than 85% at a wavelength of 400 to 700 nm.

7. The diffractive optical element according to claim 6, wherein the second inorganic particles are silica or alumina.

8. The diffractive optical element according to claim 6, wherein, in a two-dimensional coordinate system in which the vertical axis represents the refractive index at the d line and the horizontal axis represents the Abbe's number, when $n_m$ represents the refractive index at the d line of the second resin, and $v_m$ represents the Abbe's number of the second resin, the point $(n_m, v_m)$ is located in a region enclosed by (1.4, 75), (1.55, 60), (1.6, 35) and (1.45, 35), and the point $(n_{COMd}, v_{COM})$ is located in a region enclosed by (1.6, 40), (1.6, 53), (1.73,52), (1.81, 43), (1.84, 35) and (1.625, 35).

9. The diffractive optical element according to claim 8, wherein the second resin is an energy ray-curable resin comprising at least one selected from the group consisting of a methacrylic group, an acrylic group and an epoxy group.

10. The diffractive optical element according to claim 8, wherein the second resin comprises at least one selected from the group consisting of an alicyclic hydrocarbon group, a siloxane structure and a fluorine atom.

11. The diffractive optical element according to claim 6, wherein the first inorganic particles and the second inorganic particles have an effective particle diameter in the range of not less than 1 nm and not more than 100 nm.

12. A diffractive optical element comprising:

a substrate made of a first material and having a diffraction grating pattern formed on its surface; and a protective film made of a second material and covering the diffraction grating pattern, wherein the first material and the second material each comprise a resin, and at least one of the first material and the second material is a composite material that comprises a resin and first inorganic particles dispersed in the resin and containing at least zirconium oxide, has a refractive index at the d line $n_{COMd}$ of not less than 1.60 and an Abbe's number $v_{COM}$ of not less than 20, and satisfies a relationship $n_{COMd} \geq 1.8 - 0.005\, v_{COM}$ (2).

13. The diffractive optical element according to claim 12, wherein the second material is the composite material.

14. The diffractive optical element according to claim 12, wherein the composite material further comprises second inorganic particles dispersed in the resin and having an Abbe's number $v_p$ of not less than 50.

15. The diffractive optical element according to claim 14, wherein the second inorganic particles are silica or alumina.

16. The diffractive optical element according to claim 14, wherein the first inorganic particles and the second inorganic particles have an effective particle diameter in the range of not less than 1 nm and not more than 100 nm.

17. The diffractive optical element according to claim 12, wherein, in a two-dimensional coordinate system in which the vertical axis represents the refractive index at the d line and the horizontal axis represents the Abbe's number, when $n_m$ represents the refractive index at the d line of the resin constituting the composite material, and $v_m$ represents the Abbe's number of the resin, the point $(n_m, v_m)$ is located in a region enclosed by (1.4, 75), (1.55, 60), (1.6, 35) and (1.45, 35), and the point $(n_{COMd}, v_{COM})$ is located in a region enclosed by (1.6, 40), (1.6, 53), (1.81, 43), (1.84, 35) and (1.625, 35).

18. The diffractive optical element according to claim 12, wherein the resin constituting the composite material is an energy ray-curable resin comprising at least one selected from the group consisting of a methacrylic group, an acrylic group and an epoxy group.

19. The diffractive optical element according to claim 12, wherein the resin constituting the composite material comprises at least one selected from the group consisting of an alicyclic hydrocarbon group, a siloxane structure and a fluorine atom.

20. The diffractive optical element according to claim 12, wherein the first inorganic particles have an effective particle diameter in the range of not less than 1 nm and not more than 100 nm.

* * * * *